US009009236B2

(12) United States Patent
Takenouchi et al.

(10) Patent No.: US 9,009,236 B2
(45) Date of Patent: Apr. 14, 2015

(54) INFORMATION DELIVERY SYSTEM, DELIVERY DESTINATION CONTROL METHOD AND DELIVERY DESTINATION CONTROL PROGRAM

(75) Inventors: Takao Takenouchi, Tokyo (JP); Natsuko Tsutazawa, Tokyo (JP)

(73) Assignee: NEC Corporation, Tokyo (JP)

( * ) Notice: Subject to any disclaimer, the term of this patent is extended or adjusted under 35 U.S.C. 154(b) by 828 days.

(21) Appl. No.: 12/673,740

(22) PCT Filed: Aug. 4, 2008

(86) PCT No.: PCT/JP2008/063985
§ 371 (c)(1),
(2), (4) Date: Feb. 16, 2010

(87) PCT Pub. No.: WO2009/022568
PCT Pub. Date: Feb. 19, 2009

(65) Prior Publication Data
US 2011/0213842 A1  Sep. 1, 2011

(30) Foreign Application Priority Data

Aug. 16, 2007 (JP) .................................. 2007-212063

(51) Int. Cl.
G06F 15/16 (2006.01)
G06Q 30/02 (2012.01)
(Continued)

(52) U.S. Cl.
CPC ............... *G06Q 30/02* (2013.01); *H04L 12/28* (2013.01); *H04L 12/58* (2013.01)

(58) Field of Classification Search
CPC ................................. H04L 12/28; H04L 12/58
See application file for complete search history.

(56) References Cited

U.S. PATENT DOCUMENTS 6,487,584 B1  11/2002  Bunney
(Continued)

FOREIGN PATENT DOCUMENTS

JP  2000-066981 A  3/2000
(Continued)

OTHER PUBLICATIONS

International Search Report for PCT/JP2008/063985, mailed Nov. 4, 2008.
(Continued)

*Primary Examiner* — Dhairya A Patel
(74) *Attorney, Agent, or Firm* — Sughrue Mion, PLLC

(57) ABSTRACT

It is an object to efficiently deliver a message to a user who subscribes to a plurality of telecommunications carriers. An information delivery system includes an ID federation information storage unit that stores ID federation information being information associating a user identifier for identifying a user in a service provider and a user identifier for identifying the user in a telecommunications carrier which the user subscribes to, a delivery demand receiving unit that receives, from a service providing system administered by a service provider, contents of a message and a user identifier in the service provider as information indicating a user to serve as a delivery target of the message, a delivery demand processing unit that determines which telecommunications carriers the user designated as a delivery target of the message subscribes to based on ID federation information stored in the ID federation information storage unit, and determines a telecommunications carrier to serve as a delivery request destination of the message to the user from the telecommunications carriers determined that the user subscribes to according to a predetermined condition, and a delivery demand transmitting unit that transmits the contents of the message received by the delivery demand receiving unit and a user identifier in the telecommunications carrier of the user for which delivery request destination is the telecommunications carrier as information indicating a user to serve as a delivery target of the message to a delivery system of the telecommunications carrier determined as a delivery request destination by the delivery demand processing unit.

17 Claims, 24 Drawing Sheets

(51) Int. Cl.
*H04L 12/28* (2006.01)
*H04L 12/58* (2006.01)

(56) References Cited

U.S. PATENT DOCUMENTS

| | | |
|---|---|---|
| 6,965,918 B1 | 11/2005 | Arnold et al. |
| 7,853,560 B1* | 12/2010 | Sivalingham et al. ......... 707/611 |
| 8,005,090 B2* | 8/2011 | Nakamichi et al. ...... 370/395.21 |
| 8,412,282 B2* | 4/2013 | Yoon et al. .................... 455/567 |
| 2003/0096599 A1* | 5/2003 | Takatsuki ...................... 455/412 |
| 2005/0021638 A1* | 1/2005 | Caldini et al. ................ 709/206 |
| 2005/0055461 A1* | 3/2005 | Murthy et al. ................ 709/245 |
| 2006/0021019 A1* | 1/2006 | Hinton et al. ................... 726/10 |
| 2006/0123094 A1* | 6/2006 | Quine ............................ 709/206 |
| 2007/0076857 A1* | 4/2007 | Chava et al. ................ 379/88.17 |
| 2007/0156873 A1* | 7/2007 | O'Neil .......................... 709/223 |
| 2007/0184819 A1* | 8/2007 | Barriga-Caceres et al. .. 455/411 |
| 2007/0260556 A1* | 11/2007 | Pousti .............................. 705/75 |
| 2008/0010665 A1* | 1/2008 | Hinton et al. ..................... 726/1 |
| 2008/0016195 A1* | 1/2008 | Tulshibagwale et al. ..... 709/223 |
| 2008/0155032 A1* | 6/2008 | Toeroe .......................... 709/206 |
| 2009/0119763 A1* | 5/2009 | Park et al. ......................... 726/8 |
| 2009/0319684 A1* | 12/2009 | Kakivaya et al. ............. 709/238 |

FOREIGN PATENT DOCUMENTS

| | | |
|---|---|---|
| JP | 2003-158552 A | 5/2003 |
| JP | 2004-054312 A | 2/2004 |
| JP | 2004-234329 A | 8/2004 |
| JP | 2005-128672 A | 5/2005 |
| WO | WO 2004064442 A1 * | 7/2004 ............... H04Q 7/38 |

OTHER PUBLICATIONS

"Liberty ID-FF Architecture Overview", [online], Liberty Alliance project, [Searched on Aug. 15, 2007], Internet http://www.projectliberty.org/liberty/content/download/318/2366/file/draft-liberty-idff-arch-overview-1.2-errata-v1.0.

The extended European search report for PCT/JP2008063985 dated May 18, 2012.

Appelzeller G et al: "The Mobile People Architecture", Internet Citation, 1999, XP002173449.

* cited by examiner

| ID COORDINATION TABLE | | |
| --- | --- | --- |
| SERVICE PROVIDER | TELECOMMUNICATIONS CARRIER A | TELECOMMUNICATIONS CARRIER B |
| user1@sp.com | user1@a.com | user1@b.com |
| user2@sp.com | user2@a.com | — |
| user3@sp.com | — | user3@b.com |

| ID COORDINATION TABLE 1 | |
| --- | --- |
| TELECOMMUNICATIONS CARRIER A | SERVICE PROVIDER |
| user1@a.com | user1@sp.com |
| user2@a.com | user2@sp.com |

Fig. 3B

| ID COORDINATION TABLE 2 | |
| --- | --- |
| TELECOMMUNICATIONS CARRIER B | SERVICE PROVIDER |
| user1@b.com | user1@sp.com |
| user3@b.com | user3@sp.com |

| ID COORDINATION TABLE ||||
|---|---|---|---|
| ID MANAGEMENT ADMINISTRATOR | SERVICE PROVIDER | TELECOMMUNICATIONS CARRIER A | TELECOMMUNICATIONS CARRIER B |
| user1@idp.com | user1@sp.com | user1@a.com | user1@b.com |
| user2@idp.com | user2@sp.com | user2@a.com | — |
| user3@idp.com | user3@sp.com | user3@a.com | user3@b.com |
| user4@idp.com | user4@sp.com | — | user4@b.com |
| user5@idp.com | user5@sp.com | — | user5@b.com |

Fig. 5

| ID COORDINATION TABLE | | |
| --- | --- | --- |
| USER ID | TELECOMMUNICATIONS CARRIER A | TELECOMMUNICATIONS CARRIER B |
| user1@idp.com | user1@a.com | user1@b.com |
| user2@idp.com | user2@a.com | — |
| user3@idp.com | user3@a.com | user3@b.com |
| user4@idp.com | — | user4@b.com |
| user5@idp.com | — | user5@b.com |

Fig. 7

| ID COORDINATION TABLE | | | |
| --- | --- | --- | --- |
| ID MANAGEMENT ADMINISTRATOR | SERVICE PROVIDER | TELECOMMUNICATIONS CARRIER A | TELECOMMUNICATIONS CARRIER B |
| http://user1.com/ | http://user1.com/ | http://user1.com/ | http://user1.com/ |
| http://user2.com/ | http://user2.com/ | http://user2.com/ | — |
| http://user3.com/ | http://user3.com/ | http://user3.com/ | http://user3.com/ |
| http://user4.com/ | http://user4.com/ | — | http://user4.com/ |
| http://user5.com/ | http://user5.com/ | — | http://user5.com/ |

Fig. 8

| ID COORDINATION TABLE ||
|---|---|
| USER ID | ID COORDINATED PARTY |
| http://user1.com/ | TELECOMMUNICATIONS CARRIER A |
| http://user1.com/ | TELECOMMUNICATIONS CARRIER B |
| http://user2.com/ | TELECOMMUNICATIONS CARRIER A |
| http://user3.com/ | TELECOMMUNICATIONS CARRIER A |
| http://user3.com/ | TELECOMMUNICATIONS CARRIER B |
| http://user4.com/ | TELECOMMUNICATIONS CARRIER B |
| http://user5.com/ | TELECOMMUNICATIONS CARRIER B |

Fig. 9

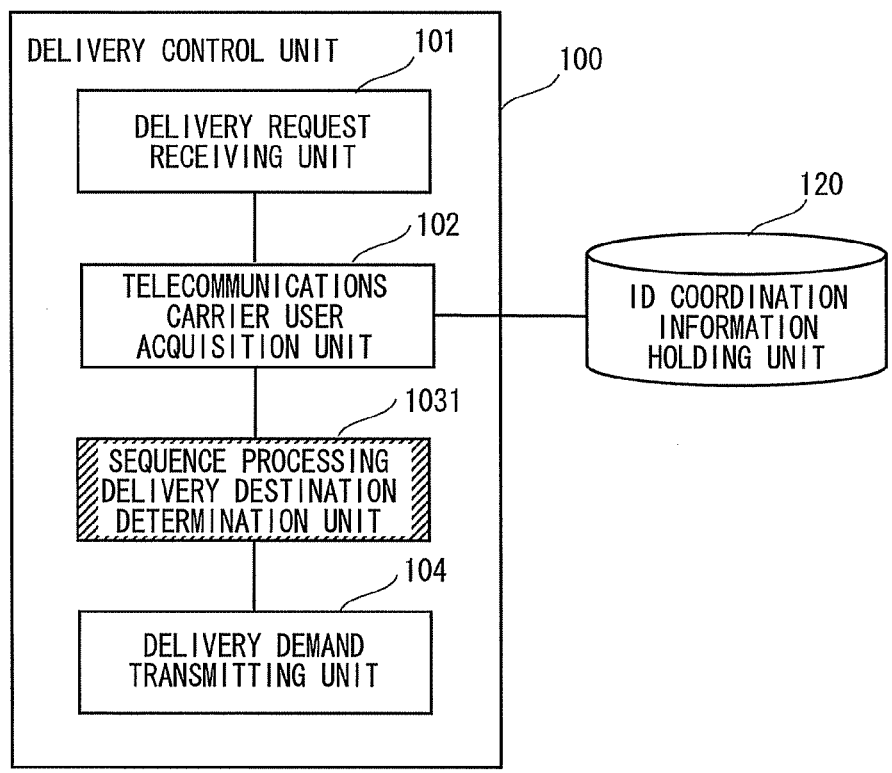

Fig. 10

| CONDITION | DELIVERY DESTINATION DETERMINATION PROCESSING |
|---|---|
| WEEKDAY | GIVE PRIORITY TO TELECOMMUNICATIONS CARRIER A (A>B) |
| HOLIDAY | GIVE PRIORITY TO TELECOMMUNICATIONS CARRIER B (B>A) |

| CONDITION | DELIVERY DESTINATION DETERMINATION PROCESSING |
|---|---|
| USER IS AT HOME | GIVE PRIORITY TO TELECOMMUNICATIONS CARRIER A (A>B) |
| USER IS AT WORK | GIVE PRIORITY TO TELECOMMUNICATIONS CARRIER B (B>A) |

Fig. 29

INFORMATION DELIVERY SYSTEM, DELIVERY DESTINATION CONTROL METHOD AND DELIVERY DESTINATION CONTROL PROGRAM

This application is the National Phase of PCT/JP2008/063985, filed on Aug. 4, 2008, which is based upon and claims the benefit of priority from Japanese patent application No. 2007-212063, filed on Aug. 16, 2007, the disclosure of which is incorporated herein in its entirety by reference.

TECHNICAL FIELD

The present invention relates to an information delivery system, a delivery destination control method and a delivery destination control program that deliver a message through a telecommunications carrier, and, particularly, to an information delivery system, a delivery destination control method and a delivery destination control program that control a delivery destination of a message when delivering a message to a user who subscribes to a plurality of telecommunications carriers.

BACKGROUND ART

A service provider has hitherto constructed a service with use of a function of a telecommunications carrier and provided a service such as sending a message to a user by using an e-mail address of the user held by the telecommunications carrier as a user ID for using the service, for example.

Further, a growing number of users subscribe to a plurality of telecommunications carriers and have a plurality of e-mail addresses, such as using a telecommunications carrier with use of a fixed network at home and using a telecommunications carrier with use of a mobile network on the move.

In such circumstances, when a service provider delivers a message to a user who subscribes to a telecommunications carrier, the service provider has requested the telecommunications carrier to deliver a message, and the telecommunications carrier has delivered the message to a designated user.

Further, in the case where a user receives services from a plurality of service providers, if the respective services are managed using different user IDs, there is a problem that it is troublesome to perform user authentication for each service. In order to solve such a problem, single sign-on technology using ID federation information that coordinates user IDs in the respective services is used, for example (cf. the non-patent document 1).

As a technique related to such ID federation, the patent document 1, for example, discloses a technique that collects information about a user by linking user IDs registered on a plurality of sites and delivers the collected result.

Further, the patent document 2, for example, discloses a technique that collects information about users for various service providers, extracts a user conforming to a condition based on the collected information and delivers a message to the user.

[Patent Document 1]
Japanese Unexamined Patent Application Publication No. 2005-128672
[Patent Document 2]
Japanese Unexamined Patent Application Publication No. 2004-54312
[Non-Patent Document 1]
"Liberty ID-FF Architecture Overview", [online], Liberty Alliance project, [Searched on Aug. 15, 2007], Internet <http://www.projectliberty.org/liberty/content/download/318/2366/file/draft-liberty-idff-arch-overview-1.2-errata-v1.0pdf>

DISCLOSURE OF INVENTION

Technical Problems

However, the following problems occur in the case where a user subscribes to a plurality of telecommunications carriers. Specifically, there is a possibility that the same message is received from the respective carriers which a user subscribes to. Further, in the case where a service provider makes payment to a telecommunications carrier according to the number of messages delivered, there is a possibility that a fee higher than the number of users to be actually delivered is paid to the telecommunications carrier.

It should be noted that the technique disclosed in the patent document 1 is a technique for creating ID federation information, and it is not considered for use in allocation of a delivery request of a message. Further, the technique disclosed in the patent document 2 aims at delivering desired information to individuals by collecting information about user's characteristics and features from a plurality of service providers and it is incapable of efficiently delivering a message to a user who subscribes to a plurality of telecommunications carriers.

In light of the foregoing, an object of the present invention is to efficiently deliver a message to a user who subscribes to a plurality of telecommunications carriers.

Technical Solution

An information delivery system according to the present invention is an information delivery system that delivers a message being information delivered from a service provider to a user through a telecommunications carrier, which includes an ID federation information storage unit that stores ID federation information being information associating a user identifier for identifying a user in a service provider and a user identifier for identifying the user in a telecommunications carrier which the user subscribes to, a delivery demand receiving unit that receives, from a service providing system administered by a service provider, contents of a message and a user identifier in the service provider as information indicating a user to serve as a delivery target of the message, a delivery demand processing unit that determines which telecommunications carriers the user designated as a delivery target of the message subscribes to based on ID federation information stored in the ID federation information storage unit, and determines a telecommunications carrier to serve as a delivery request destination of the message to the user from the telecommunications carriers determined that the user subscribes to according to a predetermined condition, and a delivery demand transmitting unit that transmits the contents of the message received by the delivery demand receiving unit and a user identifier in the telecommunications carrier of the user for which delivery request destination is the telecommunications carrier as information indicating a user to serve as a delivery target of the message to a delivery system of the telecommunications carrier determined as a delivery request destination by the delivery demand processing unit.

A delivery destination control method according to the present invention is a delivery destination control for delivering a message being information delivered from a service provider to a user through a telecommunications carrier, which includes storing ID federation information being information associating a user identifier for identifying a user in a service provider and a user identifier for identifying the user in a telecommunications carrier which the user subscribes to, receiving, from a service providing system administered by a service provider, contents of a message and a user identifier in the service provider as information indicating a user to serve as a delivery target of the message, determining which telecommunications carriers the user designated as a delivery target of the message subscribes to based on ID federation information stored in the ID federation information storage unit, and determining a telecommunications carrier to serve as a delivery request destination of the message to the user from the telecommunications carriers determined that the user subscribes to according to a predetermined condition, and transmitting the contents of the received message and a user identifier in the telecommunications carrier of the user for which delivery request destination is the telecommunications carrier as information indicating a user to serve as a delivery target of the message to a delivery system of the telecommunications carrier determined as a delivery request destination.

A delivery destination control program according to the present invention is a delivery destination control program for delivering a message being information delivered from a service provider to a user through a telecommunications carrier, which causes a computer to execute processing of receiving, from a service providing system administered by a service provider, contents of a message and a user identifier in the service provider as information indicating a user to serve as a delivery target of the message, processing of determining which telecommunications carriers the user designated as a delivery target of the message subscribes to based on ID federation information being information associating a user identifier for identifying a user in a service provider and a user identifier for identifying the user in a telecommunications carrier which the user subscribes to, and determining a telecommunications carrier to serve as a delivery request destination of the message to the user from the telecommunications carriers determined that the user subscribes to according to a predetermined condition, and processing of transmitting the contents of the received message and a user identifier in the telecommunications carrier of the user for which delivery request destination is the telecommunications carrier as information indicating a user to serve as a delivery target of the message to a delivery system of the telecommunications carrier determined as a delivery request destination.

Advantageous Effects

According to the present invention, it is possible to efficiently deliver a message to a user who subscribes to a plurality of telecommunications carriers.

BEST MODES FOR CARRYING OUT THE INVENTION

First, terms used in embodiments of the present invention are explained. ID is an identifier that uniquely identifies a user who uses a service such as a telecommunications carrier or a service provider. ID federation is to associate an ID and an ID. Authentication is to confirm the identity of a user having access. For example, the identity of a user is confirmed using a user ID and a password. Further, single sign-on is to assume that authentication is made to another ID that is ID-coordinated if authentication is made to ID of a certain user. For example, in the case where a certain user uses a plurality of services and has different user IDs for the respective services, if the user is authenticated with regard to a user ID for a certain service, it is assumed that authentication is made also a user ID for another service other than the service, so that the service becomes available. If the single sign-on function does not exist, it is necessary for a user to perform an authentication operation (e.g. input of a user ID and a password etc.) separately for the respective services, which is inconvenient. Further, a message is information which a service provider wants to deliver to a user, such as advertisement or coupon, including not only texts but also image information such as still images or moving images or audio information.

First Embodiment

A first embodiment of the present invention is described hereinafter with reference to the drawings. FIG. 1 is a schematic view of an information delivery system according to the first embodiment of the present invention. As shown in FIG. 1, the information delivery system according to the embodiment includes a delivery demand receiving unit 11, a delivery demand processing unit 12, a delivery demand transmitting unit 12 and an ID federation information holding unit 120. A service providing system 200 in FIG. 1 is a system that is administered by a service provider and provides a specific service, which is an example of a message delivery request source. Further, a delivery system 400A, 400B is a system that is administered by a telecommunications carrier A or a telecommunications carrier B and provides a communication service to each user, which is an example of a message delivery request destination. Further, user terminals 300-1 to 4 are terminals that are used by users who use the service provided by the service provider when using the communication service provided by the telecommunications carrier A, the telecommunications carrier B, which is an example of a message delivery destination.

In FIG. 1, the user terminal 300-1 is an example of a terminal that is used by a user 1 when using the communication service provided by the telecommunications carrier A. Further, the user terminal 300-2 is an example of a terminal that is used by a user 2 when using the communication service provided by the telecommunications carrier A. Further, the user terminal 300-3 is an example of a terminal that is used by a user 3 when using the communication service provided by the telecommunications carrier B. Further, the user terminal 300-4 is an example of a terminal that is used by a user 1 when using the communication service provided by the telecommunications carrier B. In the example shown in FIG. 1, the user 1 uses the communication service by the telecommunications carrier A and the communication service by the telecommunications carrier B.

The delivery demand receiving unit 11 receives, from the service providing system 200 administered by a service provider, a delivery demand of a message that includes contents of a message and a user ID in the service provider as information indicating a user to serve as a delivery target of the message.

The delivery demand processing unit 12 determines telecommunications carriers which a user designated as a message delivery target subscribes to based on ID federation information stored in an ID federation information storage unit 20, and further determines a telecommunications carrier as a delivery request destination of a message to the user among the telecommunications carriers which are determined that the user subscribes to according to a predetermined condition.

In this embodiment, ID federation information is information that coordinates (associates) a user ID for identifying a user designated as a message delivery target (i.e. a user ID in a service provider as a request source) and a user ID in a telecommunications carrier which the user subscribes to. In the case where a certain user subscribes to a plurality of telecommunications carriers, coordination is made with user IDs in the respective telecommunications carriers. The ID federation information holding unit 120 stores ID federation information. The ID federation information holding unit 120 is implemented by a storage device, for example.

The delivery demand transmitting unit 13 transmits a delivery demand of a message that includes the contents of a message received by the delivery demand receiving unit 11 and a user ID in the telecommunications carrier of a user for which the telecommunications carrier is a delivery request destination as information indicating a user to serve as a delivery target of the message to a delivery system of the telecommunications carrier determined as a delivery request destination by the delivery demand processing unit 12.

The delivery demand receiving unit 11 and the delivery demand transmitting unit 13 are implemented by a CPU that operates according to a network interface such as a LAN card and a program. Further, the delivery demand processing unit 12 is implemented by a CPU that operates according to a program.

FIG. 2 is an explanatory view showing an example of ID federation information in a configuration shown in FIG. 1. In the example shown in FIG. 2, an example of an ID federation table that associates a user ID in a telecommunications carrier which a user subscribes to with respect to each user ID in a service provider that makes a message delivery demand to the information delivery system is shown as the ID federation information.

In the example shown in FIG. 2, a user ID in the service provider that makes a message delivery demand is "userX@sp.com", a user ID in the telecommunications carrier A is "userX@a.com", and a user ID in the telecommunications carrier B is "userX@b.com". A value 1 to 3 corresponding to the user 1 to 3 is substituted into X.

The delivery demand processing unit 12 determines the presence or absence of association with a user ID in each telecommunications carrier registered on the ID federation information with respect to a user ID designated as a message delivery target (a user ID in the service provider in the example shown in FIG. 2), thereby determining which telecommunications carrier the user subscribes to. For example, in the case where association is made with a user ID in the telecommunications carrier A, it is determined that the user subscribes to the telecommunications carrier A. Further, in the case where association is made with a user ID in the telecommunications carrier B, it is determined that the user subscribes to the telecommunications carrier B.

Note that, in the case where association is made only with a user ID in the telecommunications carrier A, it can be determined that the user subscribes to the telecommunications carrier A only. Likewise, in the case where association is made only with a user ID in the telecommunications carrier B, it can be determined that the user subscribes to the telecommunications carrier B only. Further, in the case where association is made with a user ID in the telecommunications carrier A and also with a user ID in the telecommunications carrier B, it can be determined that the user subscribes to the telecommunications carrier A and the telecommunications carrier B.

Further, FIGS. 3A and 3B are explanatory views showing another example of ID federation information. As shown in FIGS. 3A and 3B, the ID federation information can be constructed by a plurality of ID federation tables. FIG. 3A shows an example of an ID federation table that associates a user ID in a service provider which the user subscribes to (a service provider that makes a message delivery request to a delivery control unit 100) with respect to each user ID in the telecommunications carrier A. FIG. 3B shows an example of an ID federation table that associates a user ID in a service provider which the user subscribes to (a service provider that makes a message delivery request to the delivery control unit 100) with respect to each user ID in the telecommunications carrier B.

In the example shown in FIG. 1, two delivery systems (delivery systems 400A and 400B) are shown as an example of the delivery system that is used for delivery of a message.

Hereinafter, a more specific configuration example is described with reference to the drawings. FIG. 4 is a block diagram showing a configuration example of an information delivery system in which the delivery demand receiving unit 11, the delivery demand processing unit 12 and the delivery demand transmitting unit 13 shown in FIG. 1 are implemented by the delivery control unit 100, and the delivery control unit 100 is incorporated into an ID management system that provides the single sign-on function. The information delivery system shown in FIG. 4 is composed of a service providing system 200, a delivery system 400A, a delivery system 400B, an ID management system 700, a user terminal 300, and a service providing system administrator terminal 800. The example shown in FIG. 4 shows a configuration example of the information delivery system in the case where, in the environment that a user of the service providing system 200 uses a communication service provided by either one or both of the delivery system 400A and the delivery system 400B and further uses the single sign-on function provided by the ID management system 700, a service provider that administers the service providing system 200 delivers an advertisement message to the user.

The service providing system 200 is a system that is administered by a service provider and provides a specific service, and it includes a delivery request transmitting unit 201, a user authentication unit 202 and a service providing unit 203. In this example, a user of the service providing system 200 is a user as a delivery target of an advertisement message.

The delivery system 400A, 400B is a system that is administered by the telecommunications carrier A or the telecommunications carrier B and provides a communication service to each user (a user in each telecommunications carrier), and it includes a delivery demand receiving unit 401, a delivery unit 402, a user authentication unit 403 and a service providing unit 404. The delivery demand receiving unit 401, the delivery unit 402, the user authentication unit 403 and the service providing unit 404 that are included in the delivery system 400A are represented as a delivery demand receiving unit 401A, a delivery unit 402A, a user authentication unit 403A and a service providing unit 404A in some cases. Further, the delivery demand receiving unit 401, the delivery unit 402, the user authentication unit 403 and the service providing unit 404 that are included in the delivery system 400B are represented as a delivery demand receiving unit 401B, a delivery unit 402B, a user authentication unit 403B and a service providing unit 404B in some cases.

The ID management system 700 is a system that is administered by an ID management administrator and provides message delivery control and single sign-on functions, and it includes a delivery control unit 100, an ID federation information holding unit 120 and an authentication execution unit 701. The delivery control unit 100 includes a delivery request receiving unit 101, a subscriber telecommunications carrier determination unit 102, a delivery destination determination unit 103 and a delivery demand transmitting unit 104. In this example, the ID management administrator can be regarded as an advertisement delivery agent for the service provider.

The user terminal 300 is a terminal that is used by a user who uses a service provided by the service provider, the telecommunications carrier A or the telecommunications carrier B.

The function of each processing unit is described hereinafter. The delivery request transmitting unit 201 of the service providing system 200 transmits a delivery request of a message to the delivery control unit 100 of the ID management system 700. The delivery request of a message is information that requests the ID management system 700 to deliver a message, and it includes at least a list of user IDs of users as delivery targets of the message and contents of the message. The user ID of a user as a delivery target of the message is specifically a user ID that is allocated to identify a user in the service providing system 200. For example, the delivery request transmitting unit 201 transmits a delivery request of a message that includes a list of user IDs of users to be delivered which are input by an administrator of the service providing system 200 and message contents to the ID management system 700 (specifically, the delivery request receiving unit 101 of the delivery control unit 100). Note that, in this example, information requesting the ID management system 700 to deliver a message is called "message delivery request" in order to distinguish it from a message delivery demand which is information requesting the delivery system 400 to deliver a message.

The service providing unit 203 provides a service (a service provided as a system including the service providing unit 203) in response to a user request from the user terminal 300. The service request is information requesting provision of a service and at least includes a user ID (in this example, a user ID recognizable by the delivery control unit 100 of the ID management system 700). When the service providing unit 203 receives the service request, it requests the user authentication unit 202 to perform authentication of a request source user and provides a service only to a user who is correctly authenticated. Further, when the service providing unit 203 receives the service request, the user authentication unit 202 performs authentication of a user as the source of the request. In this embodiment, authentication of a user is performed by conforming with the authentication execution unit 701 of the ID management system 700 whether the user has been authenticated or not.

Note that, the functions of the user authentication unit 403 and the service providing unit 404 in the delivery system 400A, 400B are the same as those of the user authentication unit 202 and the service providing unit 203 in the service providing system 200.

The delivery demand receiving unit 401 of the delivery system 400A, 400B receives a delivery demand of a message to a user in the delivery system. The delivery unit 402 delivers the message contents to the relevant user terminal 300 (specifically, the user terminal 300 associated with the requested user ID) according to the delivery request of a message that is received by the delivery demand receiving unit 401.

The authentication execution unit 701 of the ID management system 700 has a function of performing authentication of a user for the user terminal 300 which has accessed the system and checking whether the user is already authenticated or not according to a request from a system cooperating the single sign-on service (in this example, the service providing system 200 and the delivery system 400A and the delivery system 400B). The authentication execution unit 701 determines whether a user who has accessed each system has been authenticated or not by referring to the ID federation information stored in the ID federation information holding unit 120.

The delivery request receiving unit 101 of the delivery control unit 100 receives (accepts) a delivery request of a message from the delivery request transmitting unit 201 of the service providing system 200. The telecommunications carrier user acquisition unit 102 determines which telecommunications carrier a user subscribes to by referring to the ID federation information with respect to users who are designated as delivery targets indicated by the list of user IDs included in the message delivery control request received by the delivery request receiving unit 101. Then, information indicating which telecommunications carrier each user subscribes to is output to the delivery destination determination unit 103. The information indicating which telecommunications carrier each user subscribes to may be information that associates a user ID in the telecommunications carrier which the user subscribes to with a user ID of a user designated as a delivery target or a list of user IDs (in this example, user IDs in the service providing system 200) designated as a delivery target of users who subscribe to the telecommunications carrier for each telecommunications carrier.

The delivery destination determination unit 103 determines to which telecommunications carrier a delivery request is to be made for each user based on information indicating which telecommunications carrier each user subscribes to that is input from the telecommunications carrier user acquisition unit 102. The delivery demand transmitting unit 104 makes a delivery demand of a message to a user in the delivery system to each delivery system according to the request destination delivery system that is determined by the delivery destination determination unit 103. For example, the delivery demand transmitting unit 104 may make a delivery demand of a message by transmitting a message delivery demand that includes a list of user IDs in the delivery system of users for which it is determined that the delivery system is the delivery destination delivery system and message contents to the delivery demand receiving unit 401 of each delivery system.

The delivery demand receiving unit 401 of the delivery system 400A, the delivery system 400B receives a delivery demand of a message from the delivery control unit 100. The delivery unit 402 delivers the message contents to the user terminal 300 of the user indicated by the user ID in response to the delivery demand of a message that is received by the delivery demand receiving unit 401. For example, the delivery unit 402 may transmit the message by setting the designated user ID as a destination, so that the message reaches the user terminal 300 associated with the user ID.

The user terminal 300 has a function of performing authentication processing by communicating with the ID management system 700 (specifically, the authentication execution unit 701), receiving a service by communicating with a service providing unit of the delivery system 400A, the delivery system 400B or the service providing system 200 or two or more of those systems, receiving a message from a delivery unit of either one or both of the delivery system 400A and the delivery system 400B and performing display for a user. In this system, at least one user terminal 300 has a function of communicating with the service providing unit 404 of the delivery system 400A and the delivery system 400B and receiving a service and a function of communicating with the delivery unit 402 of the delivery system 400A and the delivery system 400B, receiving message contents and displaying them for a user.

The service providing system administrator terminal 800 receives information related to contents of a message to be delivered to a user and a user to whom the message is to be delivered from an administrator of the service providing system 200 and transmits them to the delivery request transmitting unit 201.

The operation in the embodiment is described next. The operation in the embodiment is described on the basis of the following assumption.

There are five users. They are distinguished by denoted as users 1 to 5.

The users 1 to 5 subscribe to a service of a service provider, and, in the service providing system 200 of the service provider, the users 1 to 5 are respectively distinguished by a user ID of "userX@sp.com" (a value 1 to 5 corresponding to the user 1 to 5 is substituted into X; the same applies below).

The users 1 to 3 subscribe to the telecommunications carrier A. In the delivery system 400A of the telecommunications carrier A, the users 1 to 3 are distinguished by a user ID of "userX@a.com".

The users 1, 3 to 5 subscribe to the telecommunications carrier B. In the delivery system 400B of the telecommunications carrier B, the users 1, 3 to 5 are distinguished by a user ID of "userX@b.com". Hereinafter, a user ID in the delivery system 400B is referred to as a user ID #400B in some cases. Further, a user ID in the delivery system 400 is referred to collectively as a user ID #400 in some cases.

The users 1 to 5 are distinguished by a user ID of "userX@idp.com" in the ID management system 700 of an ID management administrator.

In order to distinguish among user IDs in the respective systems, a user ID in the service providing system 200 is referred to as a user ID #200, a user ID in the delivery system 400A is referred to as a user ID #400A, a user ID in the service providing system 400B is referred to as a user ID #400B, and a user ID in the ID management system 700 is referred to as a user ID #700 in some cases. Further, a user ID in any delivery system 400 is referred to collectively as a user ID #400 in some cases.

The ID federation information that is stored in this example is described hereinbelow. FIG. 5 is an explanatory view showing an example of information that is stored as the ID federation information in this example. As shown in FIG. 5, as the ID federation information in this example, information that associates a user ID in the delivery system 400A (user ID #400A), a user ID in the delivery system 400B (user ID #400B) and a user ID in the service providing system 200 (user ID #700) with a user ID in the ID management system 700 (user ID #700) is stored. This indicates that at least the user ID #200 is ID-coordinated with the user ID #400 corresponding to a telecommunications carrier which the user subscribes to through the ID federation with the user ID #700. Therefore, upon receiving authentication from the ID management system 700, the users 1 to 5 can be treated as receiving authentication from the service providing system 200, the delivery system 400A or the service providing system 400B (single sign-on is available). In the case where the ID management system 700 provides a message delivery control service not only to a service provider of the service providing system 200 but also to a service provider of another service providing system, the user ID #700 and the user ID #200 are not in one-to-one correspondence in some cases. In the case where the ID management system 700 provides a message delivery control service to one service provider only, information that associates the user ID #200 and the user ID #400 without through the user ID #700 may be stored as the ID federation information. In such a case, the ID management system 700 may perform authentication management of a user with use of the user ID #200 (i.e. the user ID #700 may be treated as being the same information as the user ID #200).

In this embodiment, the operation is divided broadly into three operations: the operation of ID federation, the operation of authentication and service provision using ID federation and the operation of advertisement delivery using ID federation.

The operation of ID federation is described firstly. The operation is explained below by taking the operation when a certain user makes ID federation between a user ID in the ID management system 700 (user ID #700) and a user ID in the delivery system 400A (user ID #400A) as an example. Further, it is assumed that a WWW browser having a standard redirect (request transfer) function is used in the user terminal 300.

First, the user terminal 300 accesses the ID management system 700 according to a user manipulation and receives authentication of a user for the user ID #700 (step S0-1). The authentication execution unit 701 of the ID management system 700 may verify whether the user is an authorized user or not by transmitting the user ID #700 (e.g. "user1@idp.com") and screen information prompting input of information (password etc.) for user authentication corresponding to the user ID #700 to the user terminal 300 in response to an access from the user terminal 300, receiving the user ID #700 and information for user authentication from the user terminal 300, and comparing them with the pre-registered user information. The user ID #700 in the ID management system 700 and the information for user authentication for the user ID #700 may be set by a user upon first access to the ID management system 700. If it is verified that the user is an authorized user, the authentication execution unit 701 gives notification and lets the user terminal 300 store authentication information related to the authenticated user ID. The authentication information includes information that identifies the authenticated user ID #700. Further, information indicating a period when the authentication is valid or the like may be also included.

Next, the user terminal 300 accesses the delivery system 400A according to a user manipulation (step S0-2). At this time, the user inputs the user ID #400A (e.g. "user1@a.com"). The service providing unit 404A of the delivery system 400A requests the user authentication unit 403A to authenticate a user for the input user ID #400A (step S0-3). The user authentication unit 403A transmits an authentication check request designating the user ID #400A received from the service providing unit 404A to the authentication execution unit 701 of the ID management system 700 (step S0-4).

The authentication execution unit 701 of the ID management system 700 refers to the ID federation information based on the requested user ID #400A and replies that authentication cannot be checked for the user ID #400A because it is not ID-coordinated with the user ID #700 (in this example, it is a user ID with which authentication management is performed) (step S0-5).

If the user authentication unit 403A of the delivery system 400A receives information indicating that authentication cannot be checked because ID federation is not made, it transmits information indicating that the user ID is not coordinated to the user terminal 300 so that this is presented for the user (step S0-6). For example, the user authentication unit 403 may present that the user ID is not coordinated through the service providing unit 404 and transmit screen information inquiring whether to perform coordination of the user ID.

The user terminal 300 transmits information requesting ID federation (ID federation request) to the delivery system 400A in response to an instruction from a user (step S0-7).

If the user authentication unit 403A of the delivery system 400A receives the ID federation request, it executes user authentication in the delivery system 400A and, when the user is correctly authenticated, it transforms the ID federation request designating the user ID #400 into information to be redirected to the authentication execution unit 701 of the ID management system 700 and sends it back to the user terminal 300 (step S0-8).

The user terminal 300 transmits the ID federation request designating the user ID #400 that is authenticated in the delivery system 400A by redirect to the authentication execution unit 701 of the ID management system 700 (step S0-9).

If the authentication execution unit 701 of the ID management system 700 receives the ID federation request from the user terminal 300, it checks authentication information related to the user ID #700 stored in the user terminal 300 (authentication information generated as a result that the authentication execution unit 701 performs user authentication for the user ID #700 in the step S0-1) and specifies the user ID #700 from the authentication information. It then registers the designated user ID #400A and the user ID #700 specified from the authentication information in association with each other as the ID federation information into the ID federation information holding unit 120 (step S0-10). Specifically, "user1@idp.com" and "user1@a.com" are ID-coordinated in the above example.

Likewise, by making access to the delivery system 400B or the service providing system 200, the user ID #400B or the user ID #200 can be associated with the user ID #700 specified from the authentication information. It should be noted that, in order to perform delivery control of a message, at least the ID federation information in which a user ID of a user designated as a delivery destination of a message and a user ID in a communication system which the user subscribes to are associated with each other may be stored in the ID federation information holding unit 120, and it may be created by inputting each user ID with the consent of a user.

The operation of authentication and service provision using ID federation is described hereinbelow. The operation is explained below by taking the operation when a certain user accesses the service providing system 200 as an example.

First, in order to use a service of the service providing system 200, the user terminal 300 accesses the ID management system 700 and receives authentication for the user ID #700 that is allocated to the user (step S1-1). The user authentication operation in the ID management system 700 may be the same as that in the step S0-1.

Next, the user terminal 300 accesses the service providing system 200 according to a user manipulation (step S1-2). At this time, a user inputs the user ID #200 (e.g. "user1@sp.com"). The service providing unit 203 of the service providing system 200 requests the user authentication unit 202 to authenticate the user for the input user ID #200 (step S1-3). The user authentication unit 403A transmits an authentication check request designating the user ID #200 that is received from the service providing unit 203 to the authentication execution unit 701 of the ID management system 700 (step S1-4).

Receiving the authentication check request, the authentication execution unit 701 of the ID management system 700 refers to the ID federation information holding unit 120 and obtains the user ID #700 in the ID management system 700 which is ID-coordinated with the designated user ID #200 (which is "user1@sp.com" in this example) (step S1-5). In this example, "user1@idp.com" is obtained. Then, the authentication execution unit 701 checks whether the obtained user ID #700 has been authenticated or not, and because it has already been authenticated in the step S1-1 in this example, it assumes that the designated user ID #200 has also been authenticated and then transmits an authentication check response containing information indicating that the designated user ID #200 has been authenticated to the user authentication unit 202 of the service providing system 200 (step S1-6).

If the user authentication unit 202 of the service providing system 200 receives the information indicating that the designated user ID #200 has been authenticated from the authentication execution unit 701 of the ID management system 700, it notifies the service providing unit 203 that the user who has made access is correctly authenticated (step S1-7). If information indicating that the designated user ID #200 is not yet authenticated is received, the user authentication unit 202 may reject service provision by transmitting screen information prompting user authentication in the ID management system 700 to the user terminal 300 or may perform user authentication on its own by transmitting screen information prompting input of information for performing user authentication in the service providing system 200, for example.

If the user who has made access is correctly authenticated in the user authentication unit 202, the service providing unit 203 provides a service to the user (step S1-8).

The above-described operation is the same in the case where a user accesses the service providing unit 404 of the delivery system 400A of the telecommunications carrier A or the delivery system 400B of the telecommunications carrier B. In the case where the ID management system 700 is performing authentication management of a user with use of the user ID #200, the user ID that is input in the step S1-1 is the user ID #200. Further, it is not necessary to obtain the user ID #700 by referring to the ID federation information in the step S1-5. Specifically, whether authentication has been made or not may be checked by using the designated user ID #200 as it is. In the case of not implementing the single sign-on function, the user authentication unit 202 may perform user authentication independently in response to a request from the service providing unit 203.

The operation of advertisement delivery using ID federation is described hereinbelow. FIG. 6 is a flowchart showing an operation example of the delivery control unit 100 in the case of delivering an advertisement using ID federation.

If the delivery request receiving unit 101 receives contents of a message to be delivered as advertisement and a list of the user IDs #200 to which advertisement delivery is to be made from the delivery request transmitting unit 201 of the service providing system 200 as a delivery demand (delivery request), it transmits the received list of the user IDs #200 to the telecommunications carrier user acquisition unit 102 (step S2-1). It is assumed in this example that {"user1@sp.com", "user2@sp.com", "user3@sp.com", "user4@sp.com", "user5@sp.com"} (the list including the user IDs #200 corresponding to the users 1 to 5) is received.

The telecommunications carrier user acquisition unit 102 determines which telecommunications carrier each user designated as a delivery target subscribes to. The telecommunications carrier user acquisition unit 102 performs the following processing for each telecommunications carrier with which ID federation is made with respect to every user contained in the received list of the user IDs #200, for example (step S2-2).

For example, for the telecommunications carrier A, the telecommunications carrier user acquisition unit 102 obtains a list of "users who subscribe to the telecommunications carrier A" (subscriber users list) (step S2-2-1). The telecommunications carrier user acquisition unit 102 refers to the ID federation information and, if the user ID #400A in the telecommunications carrier A is ID-correlated with the designated user ID #200, it determines a user of the user ID #200 as a "user who subscribes to the telecommunications carrier A". Note that the case where the user ID #200 and the user ID #400A are ID-coordinated with each other includes not only the case where association is made directly but also the case where association is made through the user ID #700.

In this example, referring to FIG. 6, the user IDs #200 that are included in the list to which advertisement delivery is to be made and ID-correlated with the user ID #400 in the telecommunications carrier A are "user1@sp.com", "user2@sp.com" and "user3@sp.com" (specifically, the user IDs of the users 1 to 3). A set of the "users who subscribe to the telecommunications carrier A" is called a set A.

Further, the telecommunications carrier user acquisition unit 102 obtains a list of "users who subscribe to the telecommunications carrier B" (subscriber users list) for the telecommunications carrier B as well (step S2-2-1). In this example, "user1@sp.com", "user3@sp.com", "user4@sp.com" and "user5@sp.com" (specifically, the user IDs of the users 1 and 3 to 5) are obtained as the "users who subscribe to the telecommunications carrier B". The telecommunications carrier user acquisition unit 102 transmits the subscriber users lists of the respective telecommunications carriers obtained as above as information indicating to which telecommunications carrier each user designated as a delivery target subscribes to the delivery destination determination unit 103 (step S2-3).

If the delivery destination determination unit 103 receives the information indicating which telecommunications carrier each user designated as a delivery target subscribes to from the telecommunications carrier user acquisition unit 102, it determines to which telecommunications carrier a delivery request is to be made for each user. In this example, it is assumed that the setting is made to perform delivery without redundancy in the priority sequence of the telecommunications carrier A>the telecommunications carrier B. The delivery destination determination unit 103 determines users for whom a delivery request is to be made to each telecommunications carrier by performing the following processing (step S2-4). It should be noted that the delivery destination determination unit 103 determines to which telecommunications carrier a delivery request is to be made for each user by determining users for whom a delivery request is to be made to each telecommunications carrier. First, the priorities of the telecommunications carriers are checked (step S2-4-1), and users for whom a delivery request is to be made to the telecommunications carrier are determined for the telecommunications carrier with the highest priority (step S2-4-2). At this time, because the telecommunications carrier A has the higher priority than the telecommunications carrier B, users for whom a delivery request is to be made to the telecommunications carrier A are determined firstly. In this example, for the telecommunications carrier with the highest priority, all users who subscribe to the telecommunications carrier are users for whom a delivery request is to be made. Specifically, all users who are included in the set A may be determined as users for whom a delivery request is to be made to the telecommunications carrier A.

Next, users for whom a delivery request is to be made to the telecommunications carrier are determined for the other telecommunications carriers (step S2-4-3). In the step S2-4-3, users for whom a delivery request is to be made to the telecommunications carrier may be determined from the telecommunications carrier with the second highest priority. In this example, for the telecommunications carrier not having the highest priority, subscriber users of the telecommunications carrier excluding delivery demand users of the telecommunications carrier with the higher priority than the telecommunications carrier are determined as delivery demand users. Specifically, a set B-A that eliminates the users of the set A from the set B may be determined as users for whom a delivery request is to be made to the telecommunications carrier B. Then, the delivery destination determination unit 103 transmits information of the users for whom a delivery request is to be made to the telecommunications carrier to the delivery demand transmitting unit 104 for each telecommunications carrier (step S2-5). For example, the delivery destination determination unit 103 sends information indicating "the set A for the telecommunications carrier A, the set B-A for the telecommunications carrier B".

Although the example in which the delivery destination is determined according to the priority of the telecommunications carrier A>the telecommunications carrier B for the two telecommunications carriers of the telecommunications carrier A and the telecommunications carrier B is described above, in the case of determining the delivery destination according to the priority of the telecommunications carrier A>the telecommunications carrier B>the telecommunications carrier C for the telecommunications carrier A, the telecommunications carrier B and the telecommunications carrier C, for example, users for whom a delivery request is to be made to the telecommunications carrier C are further calculated in the step S2-4-2. In this case, the set C-A-B that eliminates the users of the set A and the set B from the set C (the redundant users are omitted) may be calculated as users for whom a delivery request is to be made to the telecommunications carrier C.

The delivery demand transmitting unit 104 receives the delivery destination information from the delivery destination determination unit 103 and makes a delivery demand to the delivery system 400 of each telecommunications carrier (step S2-6). The delivery demand transmitting unit 104 may transmit the message contents received by the delivery request receiving unit 101 and the user IDs (user 1 to 3@a.com in this example) of the respective users included in the set A as a delivery destination in the telecommunications carrier A to the delivery demand receiving unit 401 of the delivery system 400A (step S2-6-1). Further, the delivery demand transmitting unit 104 may transmit the message contents received by the delivery request receiving unit 101 and the user IDs (user 4, 5@b.com in this example) of the respective users included in the set B-A as a delivery destination in the telecommunications carrier B to the delivery demand receiving unit 401 of the delivery system 400B (step S2-6-1).

The delivery demand receiving unit 401 of the telecommunications carrier A, 400B transmits the received message contents and the transmission destination to the delivery unit 402 (step S2-7). The delivery unit 402 transmits the received message contents to the user terminal 300 designated by the delivery destination (step S2-8).

The user terminal 300 presents the received message contents for a user (step S2-9).

Although the users for whom a delivery request is to be made to the telecommunications carrier A and the telecommunications carrier B are calculated in the step S2-4-1 and the step S2-4-2 so as to make delivery without redundancy in the priority sequence of the telecommunications carrier A>the telecommunications carrier B in the above-described example, the processing of the step S2-4-1 and the step S2-4-2 may be replaced with the following processing.

For example, the delivery destination determination unit 103 calculates the following set (step S2-4-1'). The delivery destination determination unit 103 calculates a set (A∧B) only of users who subscribe to both the telecommunications carrier A and the telecommunications carrier B. Further, it calculates a set (A)only of users who subscribe to only the telecommunications carrier A. Further, it calculates a set (B)only of users who subscribe to only the telecommunications carrier B.

Then, a set of users whose delivery destination is either the telecommunications carrier A or the telecommunications carrier B is calculated as below (step S2-4-2'). Note that "α+β" indicates calculating users who belong to either set of α or β.

A set of users for whom a delivery request is to be made to the telecommunications carrier A: A'=(A)only+(A∧B)only A set of users for whom a delivery request is to be made to the telecommunications carrier B: B'=(B)only In this example also, in the case of determining the delivery destination according to the priority sequence of the telecommunications carrier A>the telecommunications carrier B>the telecommunications carrier C regarding the telecommunications carrier A, the telecommunications carrier B and the telecommunications carrier C, for example, the calculation may be made as follows.

A set of users for whom a delivery request is to be made to the telecommunications carrier A: A'=(A)only+(A∧B)only+(A∧C)only+(A∧B∧C)only A set of users for whom a delivery request is to be made to the telecommunications carrier B: B'=(B)only+(B∧C)only A set of users for whom a delivery request is to be made to the telecommunications carrier C: C'=(C)only (A∧B)only indicates a user who subscribes to only the telecommunications carrier A and the telecommunications carrier B, not including a user who subscribes to the telecommunications carrier A, the telecommunications carrier B and the telecommunications carrier C.

Although the example that determines users for whom a delivery request is to be made by using the user ID #200 designated as a delivery target as an identifier is shown in this embodiment, in the case of associating the user ID (user ID #200) in the service providing system 200 as a request source with the user ID (user ID #400A, user ID #400B) in the delivery system 400A, 400B through the user ID #700 which is the user ID in the ID management system 700, users for whom a delivery request is to be made may be determined after converting the user ID #200 designated as a delivery destination into the user ID #700.

According to the above-described method, even in the case where a plurality of service providers request delivery of an advertisement message in collaboration with one another, for example, a user designated by the user ID of the respective service providers can be uniquely identified by the user ID #700, and it is therefore possible to easily determine to which telecommunications carrier a delivery request is to be made for the user designated as a delivery target. Further, it is possible for the respective service providers to deliver an advertisement message without redundancy even if it is unknown which users overlap.

Further, although the ID federation information that is stored in the ID federation information holding unit 120 is described with reference to FIG. 5 in this embodiment, it may be stored in a format that enables identification of the user ID that can identify a user in the telecommunications carrier that is used as an actual delivery destination (which is the user ID #400A or the user ID #400B) together with the telecommunications carrier from the user ID that can identify a delivery destination user in the delivery control unit 100 (in this example, the user ID #200).

For example, in the case where the ID management administrator uses the same user ID as the service provider that requests advertisement delivery, ID federation may be made with the user ID that can identify a user in each telecommunications carrier as one user ID without distinguishing the user ID #200 and the user ID #400 as shown in FIG. 7.

Further, in the case where the ID management administrator, the service provider and the telecommunications carrier use the same user ID, for example, the ID federation information as shown in FIG. 8 may be held by maintaining the same format, or ID federation may be made by associating the user ID with information of the ID coordinated party as shown in FIG. 9.

Although there are two telecommunications carriers of the telecommunications carrier A and the telecommunications carrier B in this embodiment, if there are three or more telecommunications carriers, the number of messages that can be delivered to a user may be set in advance, and control may be made so as not to exceed the number of messages that can be delivered to a user.

As described above, according to the embodiment, it is possible to efficiently deliver a message to users who subscribe to a plurality of telecommunications carriers. For example, if the setting is made to perform delivery without redundancy according to the predetermined priority sequence as in the operation example shown in FIG. 6, even if a user subscribes to a plurality of telecommunications carriers, it is possible to eliminate the possibility that the same message is received. Further, even in the case where a service provider needs to make payment to a telecommunications carrier according to the number of messages delivered, it is possible to eliminate the possibility that a fee higher than the number of users to which the message is actually delivered is paid to the telecommunications carrier.

Further, by creating the ID federation information, a service provider can transmit an advertisement message to a user who does not wish to disclose subscribership information to a telecommunications carrier. Likewise, a user can receive a delivery service of a message from a system with which ID federation is made without disclosing subscribership information to a telecommunications carrier.

Further, if the ID federation information is applied to the single sign-on function, a user becomes free from a complicated process of authenticating a user for each system.

Second Embodiment

A second embodiment of the present invention is described hereinafter. In this embodiment, when the delivery control unit 100 determines a telecommunications carrier to serve as a delivery destination, it determines the telecommunications carrier while changing the priorities according to the preset sequence.

FIG. 10 is a block diagram showing a configuration example of the second embodiment of the present invention. As shown in FIG. 10, in the delivery control unit 100 according to this embodiment, the delivery destination determination unit 103 of the delivery control unit 100 shown in FIG. 4 is replaced with a sequence processing delivery destination determination unit 1031. The sequence processing delivery destination determination unit 1031 determines to which telecommunications carrier a delivery request is to be made for each user while changing the priorities of the telecommunications carriers at predetermined timing according to the preset sequence of the telecommunications carriers.

The operation according to the embodiment is described hereinbelow. FIG. 11 is a flowchart showing an example of a delivery destination determination operation that is performed by the sequence processing delivery destination determination unit 1031. The operation shown in FIG. 11 is an example of the delivery destination determination operation at the time of advertisement delivery using ID federation. The operation can replace the steps S2-4 to S2-5 in the example shown in FIG. 4.

If the sequence processing delivery destination determination unit 1031 receives information indicating which telecommunications carrier each user designated as a delivery target subscribes to (in this example, the set A and the set B) from the telecommunications carrier user acquisition unit 102, it determines users for whom a delivery request is to be made to each telecommunications carrier (step S2-4*a*). In this example, it is assumed that the setting is made to perform delivery without redundancy in the priority sequence of the telecommunications carrier A the telecommunications carrier B. The sequence processing delivery destination determination unit 1031 first checks the priorities of the telecommunications carriers at the current point of time. It is assumed that the higher priority is set sequentially from the telecommunications carrier to which the earliest order is set. The sequence processing delivery destination determination unit 1031 then determines to which telecommunications carrier a delivery request is to be made for each user according to the priorities of the telecommunications carriers at the current point of time.

The delivery destination determination processing according to the priorities is the same as described in the first embodiment. Specifically, the sequence processing delivery destination determination unit 1031 determines users for whom a delivery request is to be made to each telecommunications carrier by performing the following processing for each telecommunications carrier (step S2-4*a*). First, the priorities of the telecommunications carriers are checked (S2-4*a*-1), and users for whom a delivery request is to be made to the telecommunications carrier is determined for the telecommunications carrier with the highest priority (step S2-4-2). Because the priority sequence of the telecommunications carriers at this point of time is the telecommunications carrier A>the telecommunications carrier B, users for whom a delivery request is to be made to the telecommunications carrier A is determined firstly. Next, users for whom a delivery request is to be made to the telecommunications carrier is determined for the other telecommunications carriers (step S2-4-3). A this time, users for whom a delivery request is to be made to the telecommunications carrier B may be determined.

If it is determined to which telecommunications carrier a delivery request is to be made for each user, the sequence processing delivery destination determination unit 1031 transmits information about users for whom a delivery request is to be made to the telecommunications carrier for each telecommunications carrier (step S2-5*a*-1). Further, the sequence processing delivery destination determination unit 1031 changes the priorities of the telecommunications carriers for the next delivery destination determination processing (step S2-5*a*-2). At this time, the priorities are changed so that the telecommunications carrier A having been placed in the earliest order becomes the latest order. Specifically, the priority sequence is changed into telecommunications carrier B→the telecommunications carrier A. As a result, the telecommunications carrier A having had the highest priority has the lowest priority in the next delivery destination determination processing.

Although two telecommunications carriers of the telecommunications carrier A and the telecommunications carrier B are described in the above-described example, in the case where the sequence of the telecommunications carrier A→the telecommunications carrier B→the telecommunications carrier C is set, for example, the sequence processing delivery destination determination unit 1031 changes the priorities as below each time a delivery request is made.

Priority sequence in the first-time delivery: A>B>C
Priority sequence in the second-time delivery: B>C>A
Priority sequence in the third-time delivery: C>A>B>
Priority sequence in the fourth-time delivery: A>B>C According to the embodiment, it is possible to eliminate deviation of a delivery request to each telecommunications carrier. The timing of changing the priorities is not limited to each time a delivery request is made. For example, it may be each time a delivery request reaches a predetermined number or on the monthly basis.

Third Embodiment

A third embodiment of the present invention is described hereinafter. In this embodiment, when the delivery control unit 100 determines a telecommunications carrier to serve as a delivery destination, it determines the telecommunications carrier randomly.

FIG. 12 is a block diagram showing a configuration example of the third embodiment of the present invention. As shown in FIG. 12, in the delivery control unit 100 according to this embodiment, the delivery destination determination unit 103 of the delivery control unit 100 shown in FIG. 4 is replaced with a random processing delivery destination determination unit 1032. The random processing delivery destination determination unit 1032 randomly determines a telecommunications carrier to serve as a delivery destination for a user who subscribes to a plurality of telecommunications carriers.

The operation according to the embodiment is described hereinbelow. FIG. 13 is a flowchart showing an example of a delivery destination determination operation that is performed by the random processing delivery destination determination unit 1032. The operation shown in FIG. 13 is an example of the delivery destination determination operation at the time of advertisement delivery using ID federation. The operation can replace the steps S2-4 to S2-5 in the example shown in FIG. 4.

If the random processing delivery destination determination unit 1032 receives information indicating which telecommunications carrier each user designated as a delivery target subscribes to (in this example, the set A and the set B) from the telecommunications carrier user acquisition unit 102, it determines users for whom a delivery request is to be made to each telecommunications carrier. In this example, it is assumed that the setting is made to perform delivery randomly. Specifically, the random processing delivery destination determination unit 1032 performs the following processing for each user (step S2-4*b*).

The random processing delivery destination determination unit 1032 checks which telecommunications carrier the user subscribes to (step S2-4*b*-1). In the case where a user subscribes to a single telecommunications carrier, the telecommunications carrier is determined as a delivery destination of the user (step S2-4*b*-2). On the other hand, in the case where a user subscribes to a plurality of telecommunications carriers, the telecommunications carrier is selected randomly from the telecommunications carriers which the user subscribes to and determined as a delivery destination of the user (step S2-4b-3). Which telecommunications carrier the user subscribes to can be determined by checking whether the user ID of the user is contained in the list of subscriber users of each telecommunications carrier that is received from the telecommunications carrier user acquisition unit 102. At this time, whether the user subscribes to a plurality of telecommunications carriers or not is found by checking whether the user ID included in the list of subscriber users of a certain telecommunications carrier is included in the list of subscriber users of another telecommunications carrier.

If it is determined to which telecommunications carrier a delivery request is to be made for each user, the random processing delivery destination determination unit 1032 transmits information about users for whom a delivery request is to be made to the telecommunications carrier to the delivery demand transmitting unit 104 for each telecommunications carrier (step S2-5b).

In the case where the maximum number of messages transmitted is designated, the random processing delivery destination determination unit 1032 may determine users for whom a delivery request is to be made to each telecommunications carrier based on the setting information. For example, in the case where there are three telecommunications carriers (telecommunications carriers A, B and C) among which ID federation is made, and the maximum number of transmission is set to 2, the steps S2-4b-1 to S2-4b-3 may be replaced with the following processing.

In the step S2-4b-1, the random processing delivery destination determination unit 1032 checks which telecommunications carrier the user subscribes to. It is further determined whether the user subscribes to a larger number of telecommunications carriers than the maximum number of transmission. In the case where the user subscribes to the same or less number of telecommunications carriers then the maximum number of transmission, the telecommunications carriers are determined as a delivery destination of the user (step S2-4b-2'). On the other hand, in the case where the user subscribes to a larger number of telecommunications carriers than the maximum number of transmission, the same number of telecommunications carriers as the maximum number of transmission are selected randomly from the telecommunications carriers which the user subscribes to and determined as a delivery destination of the user (step S2-4b-3').

It should be noted that the delivery destination determination unit 103 described in the first embodiment and the sequence processing delivery destination determination unit 1031 described in the second embodiment may perform repetitive processing that determines a telecommunications carrier for each user just like the random processing delivery destination determination unit 1032 and select the same number of telecommunications carriers as the maximum number of transmission from the telecommunications carriers which the user subscribes to according to the priorities in the repetitive processing.

Fourth Embodiment

A fourth embodiment of the present invention is described hereinafter. In this embodiment, when the delivery control unit 100 determines a telecommunications carrier to serve as a delivery destination, it determines the telecommunications carrier according to the setting of a preset delivery ratio.

FIG. 14 is a block diagram showing a configuration example of the fourth embodiment of the present invention.

As shown in FIG. 14, in the delivery control unit 100 according to this embodiment, the delivery destination determination unit 103 of the delivery control unit 100 shown in FIG. 4 is replaced with a delivery ratio delivery destination determination unit 1033. The delivery ratio delivery destination determination unit 1033 determines a delivery destination according to a preset delivery ratio when randomly determining a telecommunications carrier.

In the case where "the weight Wa of the telecommunications carrier A=2, the weight Wb of the telecommunications carrier B=1" is set the setting of a delivery ratio, for example, the delivery ratio delivery destination determination unit 1033 determines the telecommunications carrier A as a delivery destination with twice the probability of the telecommunications carrier B.

Specifically, in the random determination processing (the step S2-4b-3) in the third embodiment shown in FIG. 13, a random value R that is a floating-point value from 0.0 to 1.0 is calculated, and if $R \leq Wa/(Wa+Wb)$, the telecommunications carrier A can be determined as a delivery destination. Otherwise, the telecommunications carrier B can be determined as a delivery destination.

For a user who subscribes to the telecommunications carriers A, B and C, in the case where "the weight Wa of the telecommunications carrier A=2, the weight Wb of the telecommunications carrier B=1 and the weight We of the telecommunications carrier C=3" is set the setting of a delivery ratio, for example, a delivery destination can be determined as follows. For example, if $R \leq Wa/(Wa+Wb+Wc)$, the telecommunications carrier A can be determined as a delivery destination, and if $R \leq (Wa+Wb)/(Wa+Wb+Wc)$, the telecommunications carrier B can be determined as a delivery destination, and otherwise the telecommunications carrier C can be determined as a delivery destination.

According to the embodiment, it is possible to perform delivery with the probability according to a predetermined delivery ratio.

Fifth Embodiment

A fifth embodiment of the present invention is described hereinafter. In this embodiment, when the delivery control unit 100 determines a telecommunications carrier to serve as a delivery destination, it determines the telecommunications carrier according to information about the cost for message delivery in each delivery system 400.

FIG. 15 is a block diagram showing a configuration example of the fifth embodiment of the present invention. As shown in FIG. 15, in this embodiment, a delivery cost information acquisition unit 105 is added to the configuration of the delivery control unit 100 shown in FIG. 4. Further, a delivery cost information transmitting unit 405 is added to the configuration of the delivery system 400. Further, the operation of the delivery destination determination unit 103 is different.

The delivery cost information acquisition unit 105 makes an inquiry to the delivery cost information transmitting unit 405 of the delivery system 400 for each delivery system 400 with which ID federation is made and acquires the information about the cost of delivery (which is referred to hereinafter as a delivery cost) required in the delivery system 400. In response to the inquiry from the delivery cost information acquisition unit 105, the delivery cost information transmitting unit 405 transmits the delivery cost in the delivery system 400.

Further, the delivery destination determination unit 103 determines to which telecommunications carrier a delivery request is to be made based on the delivery cost acquired by the delivery cost information acquisition unit 105.

The operation according to the embodiment is described hereinbelow. FIG. 16 is a flowchart showing an operation example of delivery destination determination processing in this embodiment. The operation shown in FIG. 16 is an example of the delivery destination determination operation at the time of advertisement delivery using ID federation. The operation can replace the steps S2-4 to S2-5 in the example shown in FIG. 4.

If the delivery destination determination unit 103 receives information indicating which telecommunications carrier each user designated as a delivery target subscribes to from the telecommunications carrier user acquisition unit 102, it determines users for whom a delivery request is to be made to each telecommunications carrier (step S2-4c). In this example, it is assumed that the setting is made to request delivery to the telecommunications carrier with the lower cost of delivery according to the information about the delivery cost acquired from the telecommunications carriers.

The delivery destination determination unit 103 obtains all combinations for the set of users for whom a delivery request is to be made to each telecommunications carrier (step S2-4c-1). For example, the delivery destination determination unit 103 may calculate all combinations for the number of users for whom a delivery request is to be made to each telecommunications carrier. The delivery destination determination unit 103 obtains the following combinations according to the preconditions described in the first embodiment, for example. The following combinations are shown with respect to an example using a method of determining users for whom a delivery request is to be made after converting the user ID #200 designated as a delivery destination into the user ID #700.

Combination 1 (Telecommunications carrier A: three persons/Telecommunications carrier B: two persons)
{telecommunications carrier A {"user1@idp.com", "user2@idp.com", "user3@idp.com"}, telecommunications carrier B {"user4@idp.com", "user5@idp.com"}}

Combination 2 (Telecommunications carrier A: two persons/Telecommunications carrier B: three persons)
{telecommunications carrier A {"user1@idp.com", "user2@idp.com"}, telecommunications carrier B {"user3@idp.com", "user4@idp.com", "user5@idp.com"}}

Combination 3 (Telecommunications carrier A: one person/Telecommunications carrier B: four persons)
{telecommunications carrier A {"user2@idp.com"}, telecommunications carrier B {"user1@idp.com", "user3@idp.com", "user4@idp.com", "user5@idp.com"}}

With respect to each combination, the delivery destination determination unit 103 obtains the cost for message delivery when performing delivery with the combination (step S2-4c-2). For example, the delivery destination determination unit 103 may request the delivery cost information acquisition unit 105 to make an inquiry about the cost for message delivery to each delivery system 400, and then obtain the cost for message delivery based on the delivery cost of each delivery system 400 which is acquired as a result that the delivery cost information acquisition unit 105 makes an inquiry about the amount of cost necessary when delivering a message with the number of users for which the delivery system is a delivery destination in each combination to the delivery cost information transmitting unit 405 of each delivery system 400. In the case where the amount of cost for message delivery is quantitatively set, for example, an inquiry may be made in advance about the cost for message delivery to the delivery cost information acquisition unit 105 of each delivery system 400 and the amount of cost may be stored as setting, and then the delivery destination determination unit 103 may calculate the cost for message delivery based on the stored amount of cost.

If the cost for message delivery is obtained with respect to each combination, the delivery destination determination unit 103 determines a delivery destination so as to make delivery using the combination with the lowest amount of cost (step S2-4c-3).

If it is determined to which telecommunications carrier a delivery request is to be made for each user, the delivery destination determination unit 103 transmits information of the user for whom a delivery request is to be made to the telecommunications carrier to the delivery demand transmitting unit 104 for each telecommunications carrier (S2-5c).

According to the embodiment, it is possible to make delivery using the combination with the lowest cost of delivery. For example, in the case where a communication charge of 100 yen is required for each user in the telecommunications carrier A, and a communication charge of 200 yen is required for any number of users in the telecommunications carrier B, the overall delivery charge is lower when a large volume of delivery is performed by the telecommunications carrier B. In the example of combinations described above, the cost in the case of the combination 1=500 yen, the cost in the case of the combination 2=400 yen, and the cost in the case of the combination 3=300 yen, and use of the combination 3 enables delivery by the combination with the lowest cost.

Although the case of comparing the delivery costs by the combinations of the number of users is shown in the above example, it is feasible to obtain all combinations for users designated as a delivery target. In such a case, the delivery destination determination unit 103 obtains the following combinations according to the preconditions described in the first embodiment, for example.

Combination 1 (Telecommunications carrier A: users 1, 2, 3/Telecommunications carrier B: users 4, 5)
{telecommunications carrier A {"user1@idp.com", "user2@idp.com", "user3@idp.com"}, telecommunications carrier B {"user4@idp.com", "user5@idp.com"}}

Combination 2 (Telecommunications carrier A: users 1, 2/Telecommunications carrier B: users 3, 4, 5)
{telecommunications carrier A {"user1@idp.com", "user2@idp.com"}, telecommunications carrier B {"user3@idp.com", "user4@idp.com", "user5@idp.com"}}

Combination 3 (Telecommunications carrier A: users 2, 3/Telecommunications carrier B: users 1, 4, 5)
{telecommunications carrier A {"user2@idp.com", "user3@idp.com"}, telecommunications carrier B {"user1@idp.com", "user4@idp.com", "user5@idp.com"}}

Combination 4 (Telecommunications carrier A: user 2/Telecommunications carrier B: users 1, 3, 4, 5)
{telecommunications carrier A {"user2@idp.com"}, telecommunications carrier B {"user1@idp.com", "user3@idp.com", "user4@idp.com", "user5@idp.com"}}

It is thereby possible to make delivery using the combination with the lowest cost even in the case where the delivery charge varies depending on a communication plan which a user contracts with the telecommunications carrier or the case where the delivery charge varies depending on a relationship between a request source and a user, for example.

It should noted that the delivery control unit 100 may further include an accounting management unit 106 as shown in FIG. 17. The accounting management unit 106 manages the amount of cost for delivery and transmits the amount required for message delivery to the service providing system 200 from which a request is made. It is feasible not only to notify the amount but also to make a charge of it.

Sixth Embodiment

A sixth embodiment of the present invention is described hereinafter. In this embodiment, when the delivery control unit 100 determines a telecommunications carrier to serve as a delivery destination, it determines the telecommunications carrier according to the load state of message delivery processing in each delivery system 400.

FIG. 18 is a block diagram showing a configuration example of the sixth embodiment of the present invention. As shown in FIG. 18, in this embodiment, a delivery load information acquisition unit 107 is added to the configuration of the delivery control unit 100 shown in FIG. 4. Further, a delivery load information transmitting unit 407 is added to the configuration of the delivery system 400. Further, the operation of the delivery destination determination unit 103 is different.

The delivery load information acquisition unit 107 makes an inquiry to the delivery load information transmitting unit 407 of the delivery system 400 for each delivery system 400 with which ID federation is made and acquires load information indicating the load state of the delivery system 400. In response to the inquiry from the delivery load information acquisition unit 107, the delivery load information transmitting unit 407 examines the load state of the delivery system 400 and transmits the information. The delivery load information transmitting unit 407 may refer to the number of currently waiting messages (which may include the currently delivered message) held by the delivery unit 402, for example, and use the number as the load information.

Further, the delivery destination determination unit 103 in this embodiment determines to which telecommunications carrier a delivery request is to be made based on the load information of each delivery system 400 that is acquired by the delivery load information acquisition unit 107.

The operation according to the embodiment is described hereinbelow. FIG. 19 is a flowchart showing a operation example of delivery destination determination processing in this embodiment. The operation shown in FIG. 19 is an example of the delivery destination determination operation at the time of advertisement delivery using ID federation. The operation can replace the steps S2-4 to S2-5 in the example shown in FIG. 4.

If the delivery destination determination unit 103 receives information indicating which telecommunications carrier each user designated as a delivery target subscribes to (in this example, the set A and the set B) from the telecommunications carrier user acquisition unit 102, it determines users for whom a delivery request is to be made to each telecommunications carrier. In this example, it is assumed that the setting is made to request delivery to the telecommunications carrier with the lower load according to the load information acquired from the telecommunications carriers.

If the delivery destination determination unit 103 receives the information indicating which telecommunications carrier each user designated as a delivery target subscribes to from the telecommunications carrier user acquisition unit 102, it obtains the current processing load of each delivery system 400 (S2-4d-1). The delivery destination determination unit 103 may request the delivery load information acquisition unit 107 to make an inquiry about the processing load to each delivery system 400, and then obtain the current processing load of each delivery system 400 based on the processing load of each delivery system 400 which is acquired as a result that the delivery load information acquisition unit 107 makes an inquiry about the current processing load to the delivery load information transmitting unit 407 of each delivery system 400.

If the current processing load of each delivery system 400 is obtained, the delivery destination determination unit 103 sets the priorities of the respective telecommunications carriers based thereon (S2-4d-2). It then determines users for whom a delivery request is to be made to each telecommunications carrier according to the set priorities (steps S2-4d-3 to S2-4d-3-3). The delivery destination determination processing according to the priorities is the same as the steps S2-4 to S2-4-2 in the first embodiment, and the explanation thereof is omitted.

If it is determined to which telecommunications carrier a delivery request is to be made for each user, the delivery destination determination unit 103 transmits information about users for whom a delivery request is to be made to the telecommunications carrier to the delivery demand transmitting unit 104 for each telecommunications carrier (step S2-5d).

According to the embodiment, it is possible to request delivery processing so as to ensure uniformity in the processing load of the respective delivery systems 400.

Seventh Embodiment

A seventh embodiment of the present invention is described hereinafter. In this embodiment, when the delivery control unit 100 determines a telecommunications carrier to serve as a delivery destination, it determines the telecommunications carrier according to information about a use frequency of a user in each delivery system 400.

FIG. 20 is a block diagram showing a configuration example of the seventh embodiment of the present invention. As shown in FIG. 20, in this embodiment, a use frequency information acquisition unit 108 is added to the configuration of the delivery control unit 100 shown in FIG. 4. Further, a use frequency information transmitting unit 408 is added to the configuration of the delivery system 400. Further, the operation of the delivery destination determination unit 103 is different.

The use frequency information acquisition unit 108 makes an inquiry to the use frequency information transmitting unit 408 of each delivery system 400 and acquires use frequency information of a designated user in the delivery system 400. In response to the inquiry from the use frequency information acquisition unit 108, the use frequency information transmitting unit 408 examines the use frequency of the designated user in the delivery system 400 and transmits the information. The use frequency information acquisition unit 108 may refer to the number of accesses per day from the user counted by the service providing unit 404, for example, and use the number of accesses as the use frequency information.

Further, the delivery destination determination unit 103 according to the embodiment determines to which telecommunications carrier a delivery request is to be made based on the use frequency information of the user in each delivery system 400 that is acquired by the use frequency information acquisition unit 108.

The operation according to the embodiment is described hereinbelow. FIG. 21 is a flowchart showing an operation example of delivery destination determination processing in the embodiment. The operation shown in FIG. 21 is an example of the delivery destination determination operation at the time of advertisement delivery using ID federation. The operation can replace the steps S2-4 to S2-5 in the example shown in FIG. 4.

If the delivery destination determination unit 103 receives information indicating which telecommunications carrier each user designated as a delivery target subscribes to from the telecommunications carrier user acquisition unit 102, it determines users for whom a delivery request is to be made to each telecommunications carrier. In this example, it is assumed that the setting is made to request delivery to the telecommunications carrier with the high use frequency of the user. Specifically, the delivery destination determination unit 103 performs the following processing for each user (step S2-4*e*).

The delivery destination determination unit 103 checks which telecommunications carrier the user subscribes to (step S2-4*e*-1). In the case where a user subscribes to a single telecommunications carrier, the telecommunications carrier is determined as a delivery destination of the user (step S2-4*e*-2). On the other hand, in the case where a user subscribes to a plurality of telecommunications carriers, the use frequency of the user in the delivery system 400 of the telecommunications carrier which the user subscribes to is obtained (step S2-4*e*-3). The delivery destination determination unit 103 may request the use frequency information acquisition unit 108 to make an inquiry about the use frequency of the user to the delivery system 400 which the user subscribes to, and then obtain the use frequency of the user who subscribes to a plurality of telecommunications carriers in the delivery system 400 which the user subscribes to based on the use frequency information of each delivery system 400 which is acquired as a result that the use frequency information acquisition unit 108 makes an inquiry about the use frequency designating the user ID of the user in the delivery system 400 to the use frequency information transmitting unit 408 of each requested delivery system 400.

If the use frequency of the user who subscribes to a plurality of telecommunications carriers in the delivery system 400 which the user subscribes to is obtained, the delivery destination determination unit 103 determines to which telecommunications carrier a delivery request is to be made for the user based thereon (S2-4*e*-4). For example, if a user subscribes to the telecommunications carrier A and the telecommunications carrier B and the use frequency is higher for the telecommunications carrier A, it can be determined to make a delivery request to the telecommunications carrier A with the higher use frequency.

If it is determined to which telecommunications carrier a delivery request is to be made for each user, the delivery destination determination unit 103 transmits information about users for whom a delivery request is to be made to the telecommunications carrier to the delivery demand transmitting unit 104 for each telecommunications carrier (step S2-5*e*).

According to the embodiment, it is possible to make a message delivery request to the telecommunications carrier which the user frequently uses, so that a message is delivered to a terminal (or a destination address) which the user often uses.

Eighth Embodiment

An eighth embodiment of the present invention is described hereinafter. In this embodiment, the delivery control unit 100 determines a delivery destination according to a message delivery capability of each delivery system 400.

FIG. 22 is a block diagram showing a configuration example of the eighth embodiment of the present invention. As shown in FIG. 22, in the delivery control unit 100 according to the embodiment, a delivery request destination candidate determination unit 109 is added to the configuration of the delivery control unit 100 shown in FIG. 4. Further, a delivery capability information transmitting unit 409 is added to the configuration of the delivery system 400. Further, the operation of the telecommunications carrier user acquisition unit 102 is different.

The delivery request destination candidate determination unit 109 makes an inquiry to the delivery capability information transmitting unit 409 of each delivery system 400 and acquires delivery capability information that is information for determining whether it is capable of delivering the requested message contents. It then determines the candidates of the telecommunications carrier to which a delivery request of the requested message is to be made based on the delivery capability information obtained from each delivery system 400. Specifically, the delivery request destination candidate determination unit 109 excludes the telecommunications carrier incapable of delivering the requested message contents from the candidates of the delivery request destination. In response to the inquiry from the delivery request destination candidate determination unit 109, the delivery capability information transmitting unit 409 transmits information (delivery capability information) for determining whether it is capable of delivering the contents of a designated message in the delivery system 400.

For example, the delivery request destination candidate determination unit 109 may determine the capability necessary for delivering a requested message (the maximum number of bytes sent, an attached file delivery capability, a moving image delivery capability etc.) and make an inquiry to the delivery capability information transmitting unit 409 about whether to have such capability, and the delivery capability information transmitting unit 409 may transmit by return transmission availability information indicating whether the requirements are satisfied or not compared to the delivery capability provided with the delivery system 400.

Further, for example, the delivery request destination candidate determination unit 109 may make an inquiry to the delivery capability information transmitting unit 409 about the delivery capability provided with the delivery system 400 (or the condition of a deliverable message). In this case, the delivery request destination candidate determination unit 109 may compare the delivery capability of the delivery system 400 acquired by the inquiry and the capability necessary for delivering a requested message and determine whether the delivery system 400 is provided completely with the capability necessary for delivering a requested message.

Further, the telecommunications carrier user acquisition unit 102 according to the embodiment refers to the ID federation information for the user designated as a delivery target and determines which telecommunications carrier the user subscribes to among the delivery request destination candidates determined by the delivery request destination candidate determination unit 109. It then outputs the information indicating which telecommunications carrier each user subscribes to among the delivery request destination candidates to the delivery destination determination unit 103.

The operation according to the embodiment is described hereinbelow. FIG. 23 is a flowchart showing an example of a delivery request destination candidate determination operation and a subscriber user acquisition operation in this embodiment. The operation shown in FIG. 23 is an example of the delivery request destination candidate determination operation and the subscriber user acquisition operation at the time of advertisement delivery using ID federation. The operation can replace the steps S2-2 to S2-3 in the example shown in FIG. 4.

If the delivery request receiving unit 101 receives a delivery control request of a message, the delivery request destination candidate determination unit 109 and the telecommunications carrier user acquisition unit 102 perform the following processing for each telecommunications carrier with which ID federation is made (step S2-2f). First, the delivery request destination candidate determination unit 109 obtains the delivery capability of a message (specifically, whether it is capable of delivering a requested message) in the delivery system 400 of the telecommunications carrier (S2-2f-1). For example, the delivery request destination candidate determination unit 109 may obtain whether or not the delivery system 400 is capable of delivering the requested message contents based on the delivery capability information which is obtained by making an inquiry to the delivery capability information transmitting unit 409 of the delivery system 400 by designating the requested message contents.

In response to the inquiry from the delivery request destination candidate determination unit 109, the delivery capability information transmitting unit 409 of the delivery system 400 may transmit the information (delivery capability information) for determining whether it is capable of delivering the designated message contents in the delivery system 400.

If the delivery capability of the message in the delivery system 400 of the telecommunications carrier is obtained, the delivery request destination candidate determination unit 109 determines whether the delivery system 400 is capable of delivering the requested message (S2-2f-2). At this time, the delivery system 400 incapable of delivering the requested message is eliminated from the delivery request destination candidates (S2-2f-3). Note that it may be regarded that there is no subscriber by inhibiting the telecommunications carrier user acquisition unit 102 from performing determination whether or not subscribing to the telecommunications carrier.

On the other hand, for the delivery system 400 capable of delivering the requested message, the telecommunications carrier user acquisition unit 102 determines whether a user subscribes to the telecommunications carrier and obtains a list of users who subscribe to the telecommunications carrier (a subscriber users list) (step S2-2f-4).

The telecommunications carrier user acquisition unit 102 obtains a set of users who subscribe to the telecommunications carrier capable of delivering the message contents to be delivered as advertisement (i.e. the telecommunications carrier determined as a delivery request destination candidate) among the telecommunications carriers with which the ID federation is made and transmits it to the delivery destination determination unit 103 (step S2-3f).

It should be noted that the delivery request destination candidate determination unit 109 may determine whether to serve as a delivery destination candidate for all telecommunications carriers and then transmit a list of the telecommunications carriers to serve as a delivery destination candidate to the telecommunications carrier user acquisition unit 102, and the telecommunications carrier user acquisition unit 102 may perform processing for obtaining a list of subscriber users for the telecommunications carriers to serve as a delivery destination candidate received from the delivery request destination candidate determination unit 109.

According to the embodiment, it is possible to eliminate the possibility of making a delivery request to the telecommunications carrier incapable of delivering the message contents. This embodiment can be implemented in combination not only with the first embodiment but also with another embodiment.

Ninth Embodiment

A ninth embodiment of the present invention is described hereinafter. In this embodiment, the delivery control unit 100 determines a delivery destination according to a message receiving capability of each user that can be grasped by each delivery system 400.

FIG. 24 is a block diagram showing a configuration example of the ninth embodiment of the present invention. As shown in FIG. 24, in the delivery control unit 100 according to the embodiment, a terminal information acquisition unit 110 is added to the configuration of the delivery control unit 100 shown in FIG. 4. Further, a terminal information transmitting unit 4101 and a terminal information acquisition unit 4102 are added to the configuration of the delivery system 400. Further, the operation of the delivery destination determination unit 103 is different.

The terminal information acquisition unit 4102 acquires information about at least the receiving capability of a message from the user terminal 300 which is associated with the user ID of the delivery system 400 including the terminal information acquisition unit 4102. If a terminal used for receiving a message is fixed such as a mobile terminal, for example, the terminal information acquisition unit 4102 may acquire the model number of the terminal. Further, the terminal information acquisition unit 4102 may store a circuit capacity, a memory capacity or the like for which the user makes a contract.

In response to the inquiry from the terminal information acquisition unit 110, the terminal information transmitting unit 4101 transmits information for determining whether the user terminal 300 which is associated with the designated user ID in the delivery system 400 is capable of receiving the contents of a designated message. The terminal information acquisition unit 110 makes an inquiry to the terminal information transmitting unit 4101 of the delivery system 400 which the designated user subscribes to and acquires information (terminal receiving capability information) for determining whether the user terminal 300 which is associated with the user ID of the designated user is capable of receiving the requested message contents.

Further, the delivery destination determination unit 103 according to the embodiment determines whether it is capable of receiving the message requested from the telecommunications carrier which the user subscribes to for each user based on the information indicating which telecommunications carrier each user subscribes to that is obtained by the telecommunications carrier user acquisition unit 102. Even if a user subscribes to the telecommunications carrier, if it is determined that it is incapable of receiving the requested message, the delivery destination determination unit 103 excludes the telecommunications carrier from the delivery request destination candidates of the user.

The operation according to the embodiment is described hereinbelow. FIG. 25 is a flowchart showing an example of the operation according to the embodiment. The operation shown in FIG. 25 is shown as an example of the operation that is performed as preprocessing of the delivery destination determination operation at the time of advertisement delivery using ID federation (the operation that is performed before the step S2-4 in FIG. 4).

It should be noted that the following processing is executed in advance in this embodiment.

In the case of the delivery system 400 in which a terminal at least used for receiving a message is fixed, the terminal information acquisition unit 4102 acquires the model number of the terminal from the user terminal 300. It may be acquired by manual input at the time of contract.

In the case of the delivery system 400 in which there is a limit to a circuit capacity or a memory capacity at least used for receiving a message, the terminal information acquisition unit 4102 acquires the circuit capacity or the memory capacity for which each user makes a contract. It may be acquired by manual input at the time of contract.

In this example, it is assumed that the setting is made not to make delivery to the user terminal 300 incapable of receiving a message according to the information of the message receiving capability of the user terminal acquired from the telecommunications carrier. If the delivery destination determination unit 103 receives information indicating which telecommunications carrier each user designated as a delivery target subscribes to from the telecommunications carrier user acquisition unit 102, it performs the following processing for each user (step S2-4h-1).

The delivery destination determination unit 103 obtains the message receiving capability (specifically, whether it is capable of receiving a requested message) in the delivery system 400 of the telecommunications carrier which the user subscribes to for the user (step S2-4h-1-1). For example, the delivery destination determination unit 103 may request the terminal information acquisition unit 110 to make an inquiry about the message receiving capability by designating the delivery system 400 of the telecommunications carrier which the user subscribes to for the user, and obtain the message receiving capability in the delivery system 400 of the telecommunications carrier which the user subscribes to based on the terminal receiving capability information which is obtained as a result that the terminal information acquisition unit 110 makes an inquiry about the message receiving capability of the user to the terminal information transmitting unit 4101 of the designated delivery system 400.

The terminal information transmitting unit 4101 of the designated delivery system 400 may transmit information such as the model number of the user terminal 300 of the user or the circuit capacity, the memory capacity or the like for which the user makes a contract that are previously acquired by the terminal information acquisition unit 4102, in response to the inquiry from the terminal information acquisition unit 110.

If the message receiving capability in the delivery system 400 of the telecommunications carrier which the user subscribes to is obtained, the delivery destination determination unit 103 determines whether the user is capable of receiving the requested message through the delivery system 400 of the telecommunications carrier for each telecommunications carrier which the user subscribes to (step S2-4h-1-2). For example, the delivery destination determination unit 103 may determine whether the user uses the user terminal 300 capable of receiving the requested message in the delivery system 400 of the telecommunications carrier which the user subscribes to. If it is determined that it is incapable of receiving the requested message, it is eliminated from the delivery request destination candidates of the delivery system 400 of the telecommunications carrier (step S2-4h-1-3). Specifically, the user ID of the user may be deleted from the list of subscriber users of the telecommunications carrier that is created by the telecommunications carrier user acquisition unit 102.

After performing the above processing for each user, the delivery destination determination unit 103 determines a delivery destination with use of the updated subscriber users list (S2-4h-2). This embodiment can be implemented in combination not only with the first embodiment but also with another embodiment.

According to the embodiment, it is possible to perform message delivery destination control according to the message receiving capability of a user. Specifically, it is possible to eliminate the possibility of making a delivery request to the telecommunications carrier incapable of receiving the message contents due to factors on the user side for each user.

Tenth Embodiment

A tenth embodiment of the present invention is described hereinafter. In this embodiment, the delivery control unit 100 determines a telecommunications carrier according to a rule.

FIG. 26 is a block diagram showing a configuration example of the tenth embodiment of the present invention. As shown in FIG. 26, in the delivery control unit 100 according to this embodiment, a delivery destination determination rule storing unit 111 is added to the configuration of the delivery control unit 100 shown in FIG. 4. Further, a rule setting terminal 130 is included as the information delivery system.

The delivery destination determination rule storing unit 111 stores a rule for determining a delivery destination (which is referred to hereinafter as a delivery destination determination rule). The delivery destination determination rule may be information that is represented by a set of "condition" and "delivery destination determination processing", for example. FIG. 27 shows an example of the delivery destination determination rule. In the example shown in FIG. 27, the case of "weekday" and the case of "holiday" are defined as the "condition". Further, the setting of "give priority to the telecommunications carrier A" when the condition of "weekday" is met, and the setting of "give priority to the telecommunications carrier B" when the condition of "holiday" is met are defined. This enables that a message is sent to a terminal for office on weekdays, and a message is sent to a terminal for private on holidays. It is also possible to set a rule that changes the priorities of telecommunications carriers depending on time periods.

The delivery destination determination rule may be set in advance or set dynamically by a user, a telecommunications carrier or a service provider. Further, one rule may be set as a whole system or may be set for each user.

Further, the rule setting terminal 130 is a terminal for setting the delivery destination determination rule. Specifically, it stores the delivery destination determination rule into the delivery destination determination rule storing unit 111 or changes the delivery destination determination rule stored in the delivery destination determination rule storing unit 111.

The delivery destination determination unit 103 in this embodiment determines a delivery destination according to the delivery destination determination rule stored in the delivery destination determination rule storing unit 111. For example, when determining a delivery destination, the delivery destination determination unit 103 refers to the delivery destination determination rule stored in the delivery destination determination rule storing unit 111 and performs processing according to the "delivery destination determination processing" conforming to the "condition" defined in the delivery destination determination rule, thereby determining the delivery destination.

According to the embodiment, it is possible to determine the delivery destination by complicated delivery determination processing.

Eleventh Embodiment

As shown in FIG. 28, a presence information acquisition unit 112 may be further added to the delivery control unit 100, and a presence information transmitting unit 412 may be added to the delivery system 400 in the tenth embodiment. FIG. 28 is a block diagram showing a configuration example of the eleventh embodiment of the present invention.

This embodiment is an example in which the delivery system 400 performs a service corresponding to presence information of a user, and the presence information is used for the "condition" of the delivery destination determination rule. The presence information is information indicating the current circumstances of a user (e.g. where s user is, currently on the phone, away from the desk etc.). The presence information may be automatically acquired by the delivery system 400 using GPS or the like in some cases, or acquired by user input in other cases.

The presence information acquisition unit 112 makes an inquiry to the presence information transmitting unit 412 of each delivery system 400 and acquires presence information of the designated user in the delivery system 400. In response to the inquiry from the presence information acquisition unit 112, the presence information transmitting unit 412 transmits the presence information of the designated user in the delivery system 400.

The delivery destination determination unit 103 in this embodiment determines whether to meet the "condition" of the delivery destination determination rule stored in the delivery destination determination rule storing unit 111 based on the presence information acquired by the presence information acquisition unit 112. Then, the processing is performed according to the "delivery destination determination processing" conforming to the "condition" of the delivery destination determination rule, thereby determining the delivery destination.

The delivery destination determination unit 103 may request the presence information acquisition unit 112 to make an inquiry about the presence information of the user to the delivery system 400 that performs a service according to the presence information conformity to the "condition" of the delivery destination determination rule among delivery systems 400 of the telecommunications carriers which the user subscribes to for each user, for example. Then, the delivery destination determination unit 103 may determine the "condition" of the delivery destination determination rule based on the presence information of the user which is obtained as a result that the presence information acquisition unit 112 makes an inquiry to the presence information transmitting unit 412 of the delivery system 400.

FIG. 29 is an explanatory view showing an example of the delivery destination determination rule according to the embodiment. In the example shown in FIG. 29, the case when "a user is at home" and the case when "a user is at work" are defined as the "condition". Further, the setting of "give priority to the telecommunications carrier A" when the condition of "a user is at home" is met, and the setting of "give priority to the telecommunications carrier B" when the condition of "a user is at work" is met are defined.

In the case where such a delivery destination determination rule is set, the delivery destination determination unit 103 may acquire position information of a user by requesting the presence information acquisition unit 112 to make an inquiry about position information of the user to the delivery system 400 that performs a service according to the position information among the delivery systems 400 of the telecommunications carriers which the user subscribes to with respect to each user. In the case where the delivery system 400 stores the position information of a user by the current position such as GPS, whether "user is at home" or not may be determined by inquiring for information about the user's address as well as determining whether the user is located in the position close to the user's address. Alternatively, information indicating whether a user is at home or not may be inquired as the presence information, and the determination may be made on the delivery systems 400 side.

According to the embodiment, it is possible to determine the delivery destination under the condition consistent with the user's circumstances.

Although most of the above-described embodiments are explained using the case of determining one telecommunications carrier as a delivery destination determination as an example, in the case where the maximum number of messages sent is designated, the telecommunications carriers within the maximum number of messages sent among the telecommunications carriers satisfying the condition as a delivery destination can be determined as a delivery request destination based on the setting information in any embodiments. Note that whether to satisfy the condition as a delivery destination or not and how to select one from the telecommunications carriers satisfying the condition as a delivery destination may conform to a condition of selecting a delivery request destination candidate (specifically, conditions of message delivery capability, message receiving capability, delivery destination determination rule etc.) or a method of determining a telecommunications carrier (specifically, determination based on priorities, random determination, determination based on a delivery ratio etc.) in the respective embodiments. As a method of determining a plurality of telecommunications carriers, the operation of determining one telecommunications carrier may be performed repeatedly while excluding the already determined telecommunications carrier from the delivery request destination candidates.

The above-described embodiment shows a configuration of an information delivery system that includes an ID federation information storage unit that stores ID federation information being information associating a user identifier for identifying a user in a service provider and a user identifier for identifying the user in a telecommunications carrier which the user subscribes to, a delivery demand receiving unit that receives, from a service providing system administered by a service provider, contents of a message and a user identifier in the service provider as information indicating a user to serve as a delivery target of the message, a delivery demand processing unit that determines which telecommunications carriers the user designated as a delivery target of the message subscribes to based on ID federation information stored in the ID federation information storage unit, and determines a telecommunications carrier to serve as a delivery request destination of the message to the user from the telecommunications carriers determined that the user subscribes to according to a predetermined condition, and a delivery demand transmitting unit that transmits the contents of the message received by the delivery demand receiving unit and a user identifier in the telecommunications carrier of the user for which delivery request destination is the telecommunications carrier as information indicating a user to serve as a delivery target of the message to a delivery system of the telecommunications carrier determined as a delivery request destination by the delivery demand processing unit. In this example, the ID federation information storage unit is implemented by the ID federation information holding unit 120, for example. The delivery demand receiving unit is implemented by the delivery demand receiving unit 11 or the delivery request receiving unit 101, for example. The delivery demand processing unit is implemented by the delivery demand processing unit 12 or the telecommunications carrier user acquisition unit 102, for example. The delivery demand transmitting unit is implemented by the delivery demand transmitting unit 13 or the delivery demand transmitting unit 104, for example.

Further, the above-described embodiment shows a configuration of an information delivery system in which, as for a user who subscribes to a plurality of telecommunications carriers, the delivery demand processing unit determines any one telecommunications carrier among the telecommunications carriers which the user subscribes to as a delivery request destination of a message. Further, the above-described embodiment also shows a configuration of an information delivery system in which, as for a user who subscribes to a plurality of telecommunications carriers, the delivery demand processing unit determines a designated number or less of telecommunications carriers among the telecommunications carriers which the user subscribes to as a delivery request destination of a message.

Further, the above-described embodiment shows a configuration of an information delivery system in which, as for a user who subscribes to a plurality of telecommunications carriers, the delivery demand processing unit determines a telecommunications carrier to serve as a delivery request destination according to a predetermined method (cf. e.g. the first to ninth embodiments).

Further, the above-described embodiment shows a configuration of an information delivery system in which, as for a user who subscribes to a plurality of telecommunications carriers, the delivery demand processing unit determines a telecommunications carrier to serve as a delivery request destination according to preset priorities of the telecommunications carriers. In this example, the delivery demand processing unit is implemented by the telecommunications carrier user acquisition unit 102 and the delivery destination determination unit 103 in the first embodiment, for example.

Further, the above-described embodiment shows a configuration of an information delivery system in which, as for a user who subscribes to a plurality of telecommunications carriers, the delivery demand processing unit determines a telecommunications carrier to serve as a delivery request destination according to priorities at a given point of time while changing priorities at predetermined timing along a preset sequence of the telecommunications carriers. In this example, the delivery demand processing unit is implemented by the telecommunications carrier user acquisition unit 102 and the sequence processing delivery destination determination unit 1031 in the second embodiment, for example.

Further, the above-described embodiment shows a configuration of an information delivery system in which, as for a user who subscribes to a plurality of telecommunications carriers, the delivery demand processing unit randomly determines a telecommunications carrier to serve as a delivery request destination. In this example, the delivery demand processing unit is implemented by the telecommunications carrier user acquisition unit 102 and the random processing delivery destination determination unit 1032 in the third embodiment, for example.

Further, the above-described embodiment shows a configuration of an information delivery system in which, as for a user who subscribes to a plurality of telecommunications carriers, the delivery demand processing unit determines a telecommunications carrier to serve as a delivery request destination according to a preset delivery ratio for the telecommunications carriers. In this example, the delivery demand processing unit is implemented by the telecommunications carrier user acquisition unit 102 and the delivery ratio delivery destination determination unit 1033 in the fourth embodiment, for example.

Further, the above-described embodiment shows a configuration of an information delivery system in which the delivery demand processing unit determines a telecommunications carrier to serve as a delivery request destination based on information obtained by making an inquiry to a delivery system of a telecommunications carrier (cf. e.g. the fifth to eleventh embodiments).

Further, the above-described embodiment shows a configuration of an information delivery system in which the delivery demand processing unit makes an inquiry about a cost for message delivery to a delivery system of a telecommunications carrier and determines a telecommunications carrier to serve as a delivery request destination according to a cost for message delivery in each telecommunications carrier obtained as a result. In this example, the delivery demand processing unit is implemented by the telecommunications carrier user acquisition unit 102, the delivery destination determination unit 103 and the delivery cost information acquisition unit 105 in the fifth embodiment, for example.

Further, the above-described embodiment shows a configuration of an information delivery system in which the delivery demand processing unit makes an inquiry about a load state of message delivery processing to a delivery system of a telecommunications carrier and determines a telecommunications carrier to serve as a delivery request destination according to a load state of message delivery processing in each telecommunications carrier obtained as a result. In this example, the delivery demand processing unit is implemented by the telecommunications carrier user acquisition unit 102, the delivery destination determination unit 103 and the delivery load information acquisition unit 107 in the sixth embodiment, for example.

Further, the above-described embodiment shows a configuration of an information delivery system in which the delivery demand processing unit makes an inquiry about a use frequency of a user to a delivery system of a telecommunications carrier and determines a telecommunications carrier to serve as a delivery request destination according to a use frequency of a user in each telecommunications carrier obtained as a result. In this example, the delivery demand processing unit is implemented by the telecommunications carrier user acquisition unit 102, the delivery destination determination unit 103 and the use frequency information acquisition unit 108 in the seventh embodiment, for example.

Further, the above-described embodiment shows a configuration of an information delivery system in which the delivery demand processing unit makes an inquiry about a message delivery capability to a delivery system of a telecommunications carrier, determines whether the telecommunications carrier is capable of delivering a message intended to be delivered based on a message delivery capability obtained as a result, and determines a telecommunications carrier to serve as a delivery request destination from telecommunications carriers capable of delivering a message intended to be delivered. In this example, the delivery demand processing unit is implemented by the telecommunications carrier user acquisition unit 102, the delivery destination determination unit 103 and the delivery request destination candidate determination unit 109 in the eighth embodiment, for example.

Further, the above-described embodiment shows a configuration of an information delivery system in which, as for a user designated as a delivery target of a message, the delivery demand processing unit makes an inquiry to a delivery system of a telecommunications carrier which the user subscribes to about a message receiving capability of the user stored in the delivery system, determines whether the user is capable of receiving a message intended to be delivered through the telecommunications carrier based on a message receiving capability of the user in the telecommunications carrier obtained as a result, and determines a telecommunications carrier to serve as a delivery request destination from telecommunications carriers with which the user is capable of receiving a message intended to be delivered. In this example, the delivery demand processing unit is implemented by the telecommunications carrier user acquisition unit 102, the delivery destination determination unit 103 and the terminal information acquisition unit 110 in the ninth embodiment, for example.

Further, the above-described embodiment shows a configuration of an information delivery system in which the delivery demand processing unit determines a telecommunications carrier to serve as a delivery request destination according to a delivery destination determination rule that defines a method of determining a delivery request destination and a condition for performing the method. In this example, the delivery demand processing unit is implemented by the telecommunications carrier user acquisition unit 102, the delivery destination determination unit 103 and the delivery destination determination rule storing unit 111 in the tenth embodiment, for example.

Further, the above-described embodiment shows a configuration of an information delivery system in which a condition related to presence information of a user is set to the delivery destination determination rule, and the delivery demand processing unit determines a telecommunications carrier to serve as a delivery request destination for each user by determining whether each user matches the condition of the delivery destination determination rule based on presence information of a user obtained from a delivery system of a telecommunications carrier. In this example, the delivery demand processing unit is implemented by the telecommunications carrier user acquisition unit 102, the delivery destination determination unit 103 and the presence information acquisition unit 112 in the eleventh embodiment, for example.

INDUSTRIAL APPLICABILITY

The present invention is applicable to any system as long as it is a system that delivers a message to a user managed by an ID. For example, an application method is possible that makes ID federation of a user ID in a mobile communication system and a user ID in another internet service provider system and controls a delivery destination of a message between telecommunications carriers. Further, for example, an application method is possible that controls a delivery destination of a message for a department store not providing a service using a system through a device requesting delivery of a message.

BRIEF DESCRIPTION OF DRAWINGS

FIG. 2 is an explanatory view showing an example of ID federation information;

FIGS. 3A and 3B are explanatory views showing another example of ID federation information;

FIG. 5 is an explanatory view showing an example of information stored as ID federation information;

FIG. 7 is an explanatory view showing another example of information stored as ID federation information;

FIG. 8 is an explanatory view showing another example of information stored as ID federation information;

FIG. 9 is an explanatory view showing another example of information stored as ID federation information;

FIG. 10 is a block diagram showing a configuration example according to the second embodiment;

FIG. 29 is an explanatory view showing an example of a delivery destination determination rule in the eleventh embodiment.

EXPLANATION OF REFERENCE

Figure 1:
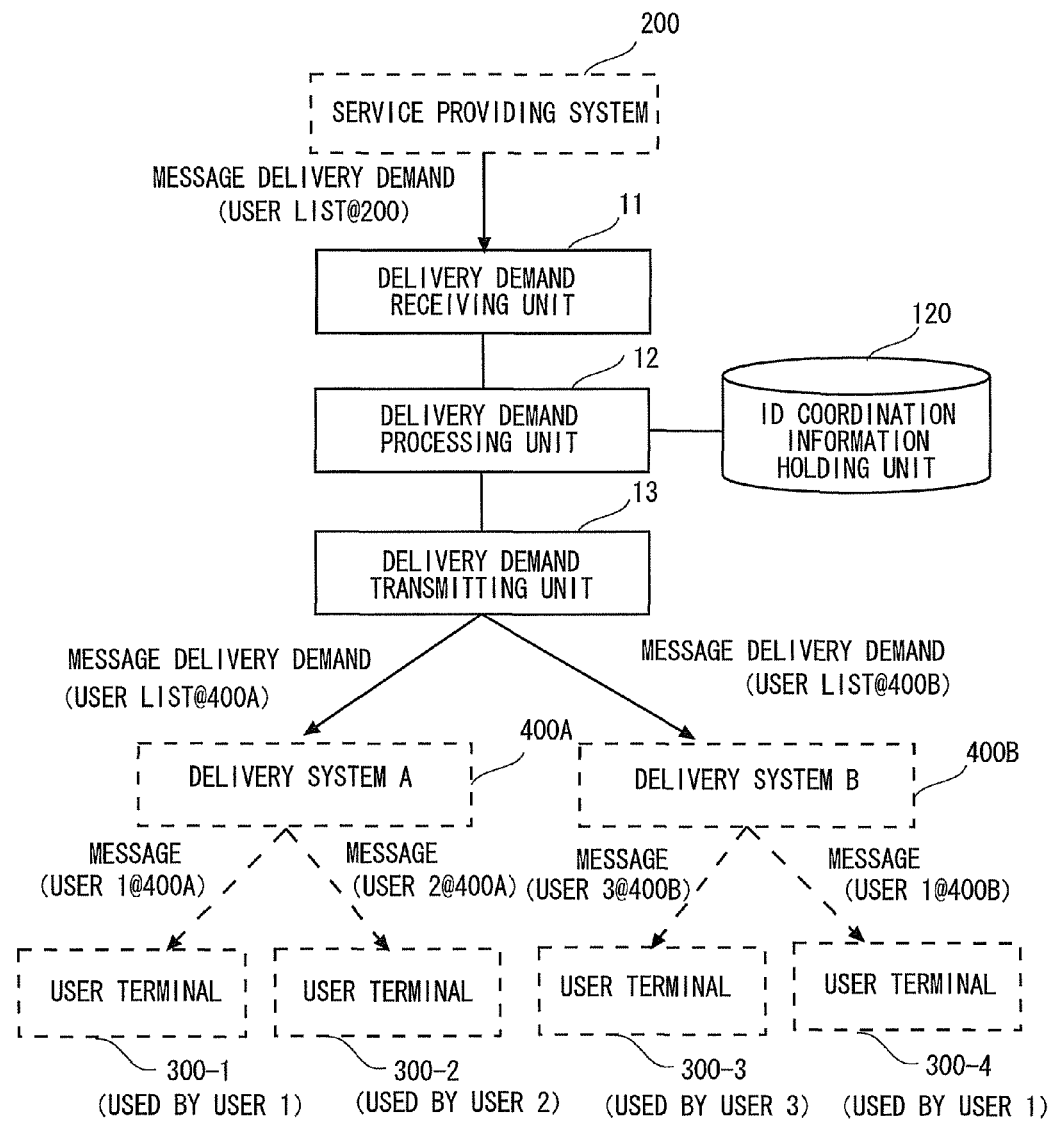
FIG. 1 is a schematic view of an information delivery system according to the first embodiment.
Figure 4:
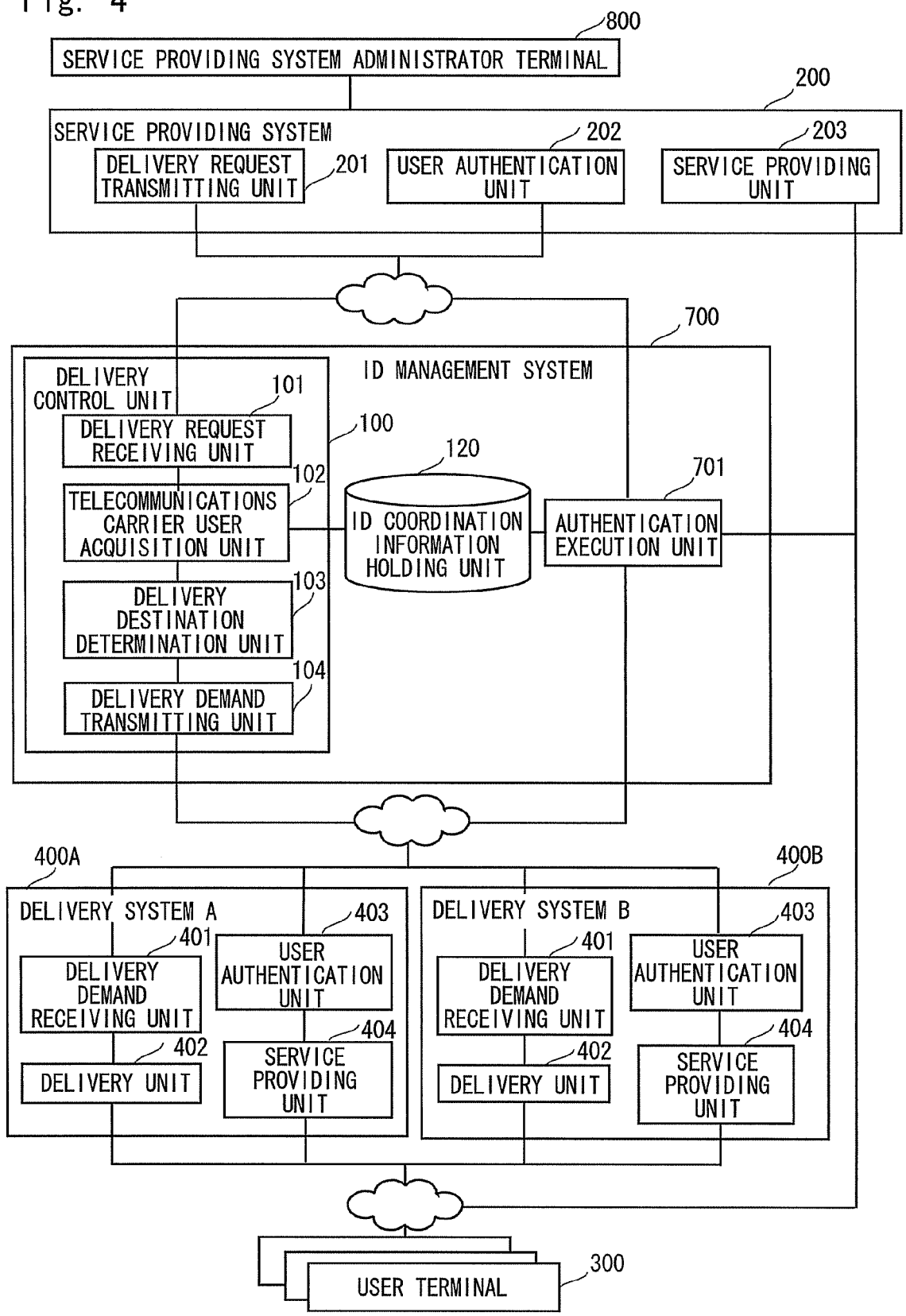
FIG. 4 is a block diagram showing a configuration example of an information delivery system according to the first embodiment.
Figure 6:
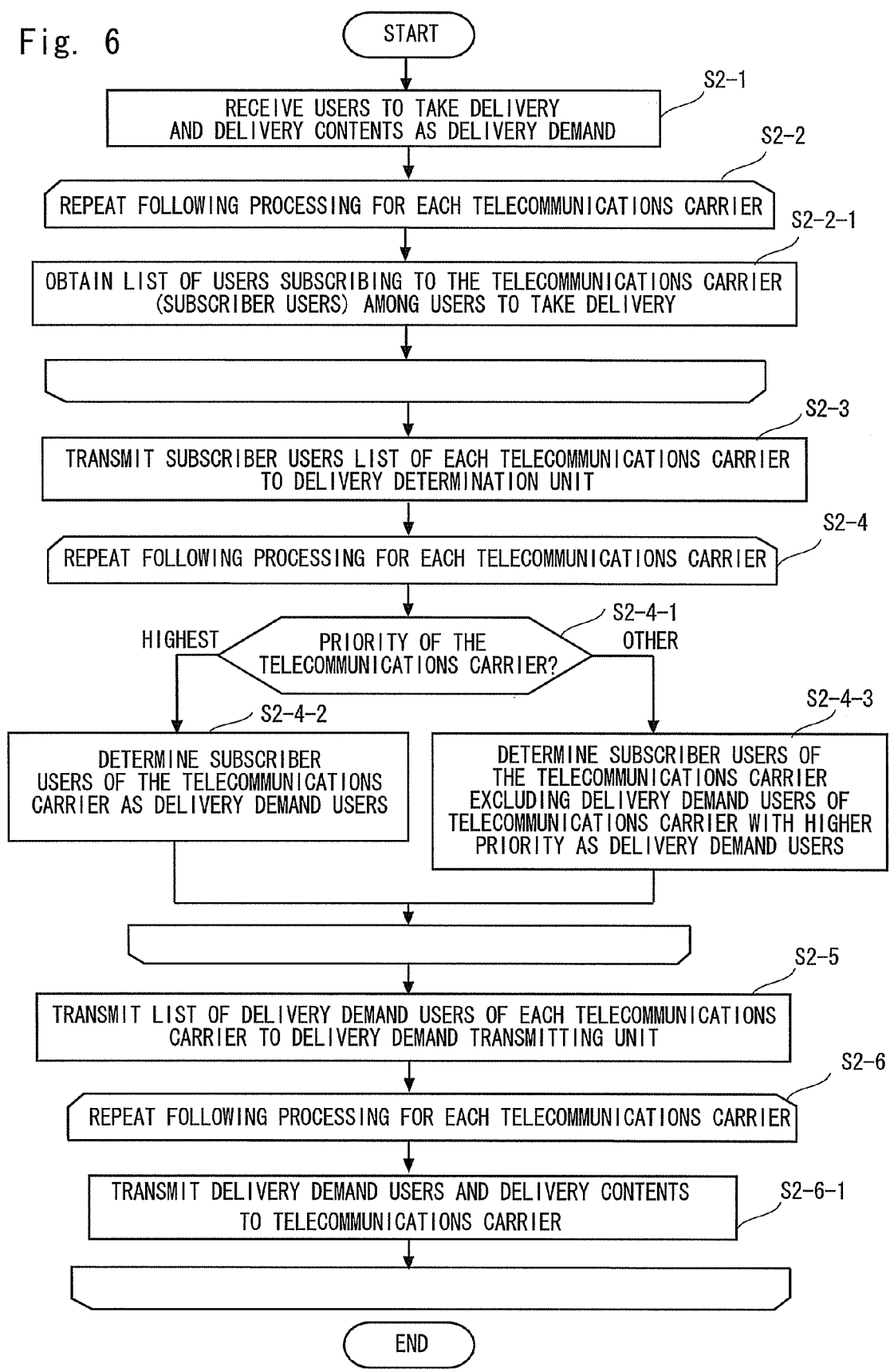
FIG. 6 is a flowchart showing an operation example of the delivery control unit 100 in the case of delivering an advertisement using ID federation.
Figure 11:
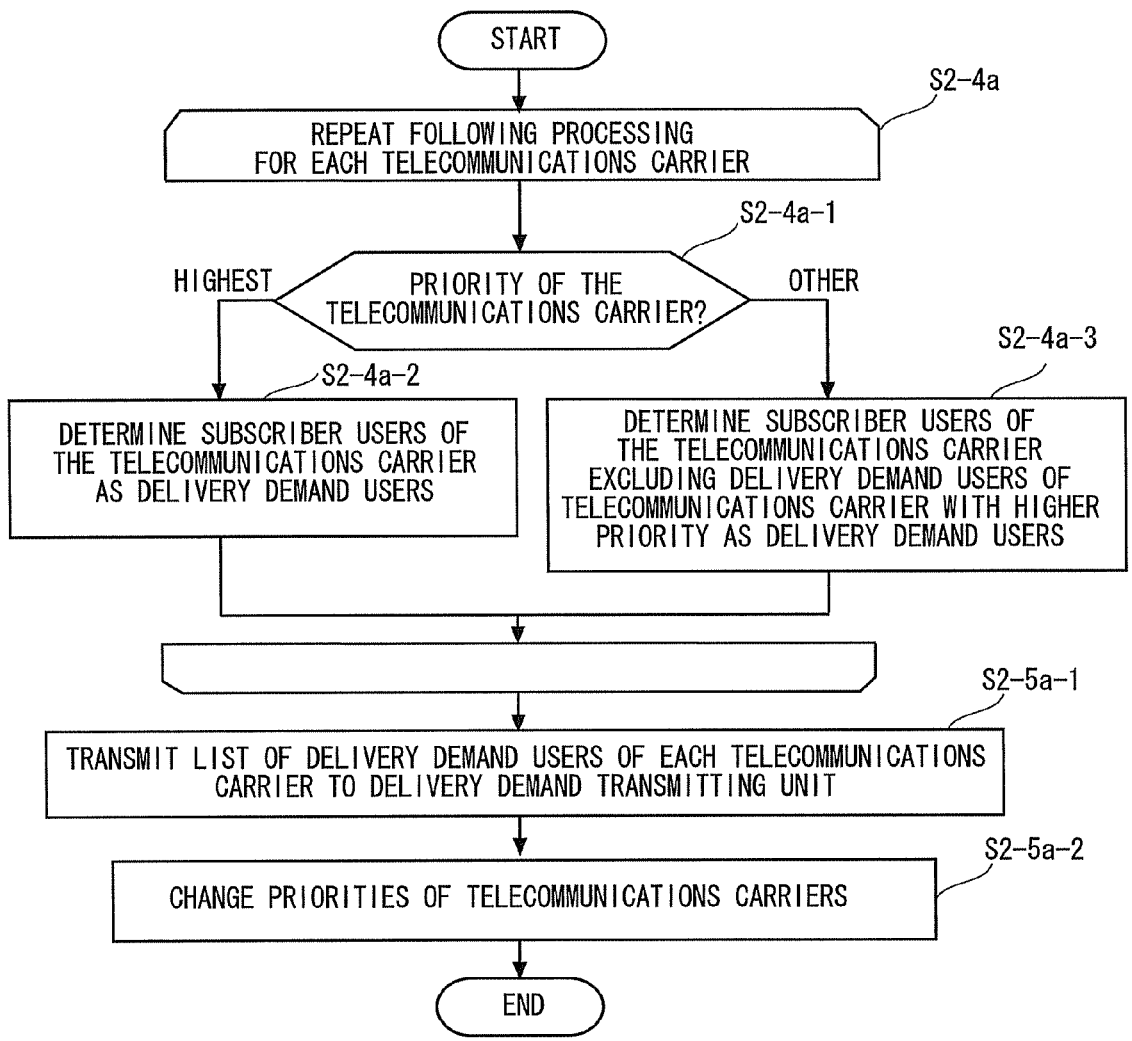
FIG. 11 is a flowchart showing an example of a delivery destination determination operation performed by the sequence processing delivery destination determination unit 1031.
Figure 12:
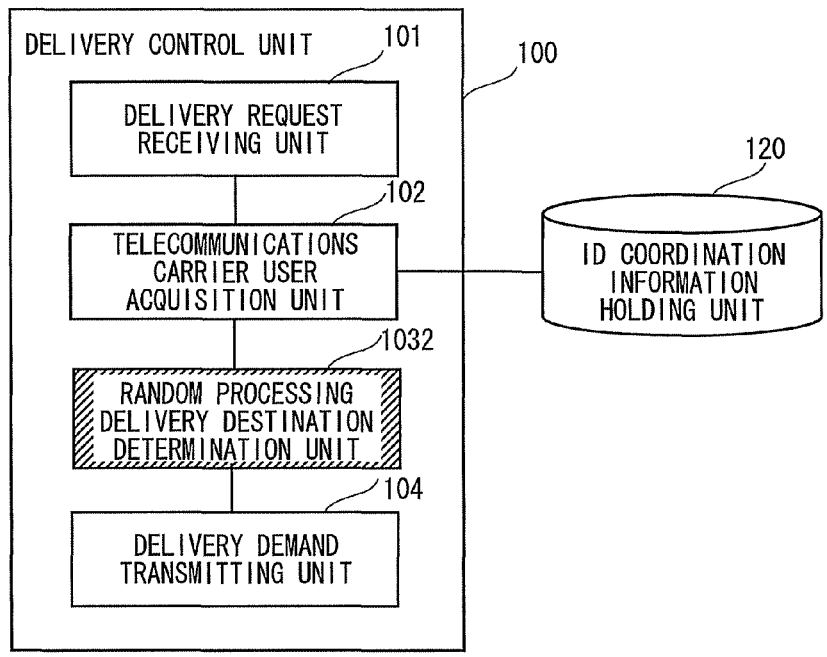
FIG. 12 is a block diagram showing a configuration example according to the third embodiment.
Figure 13:
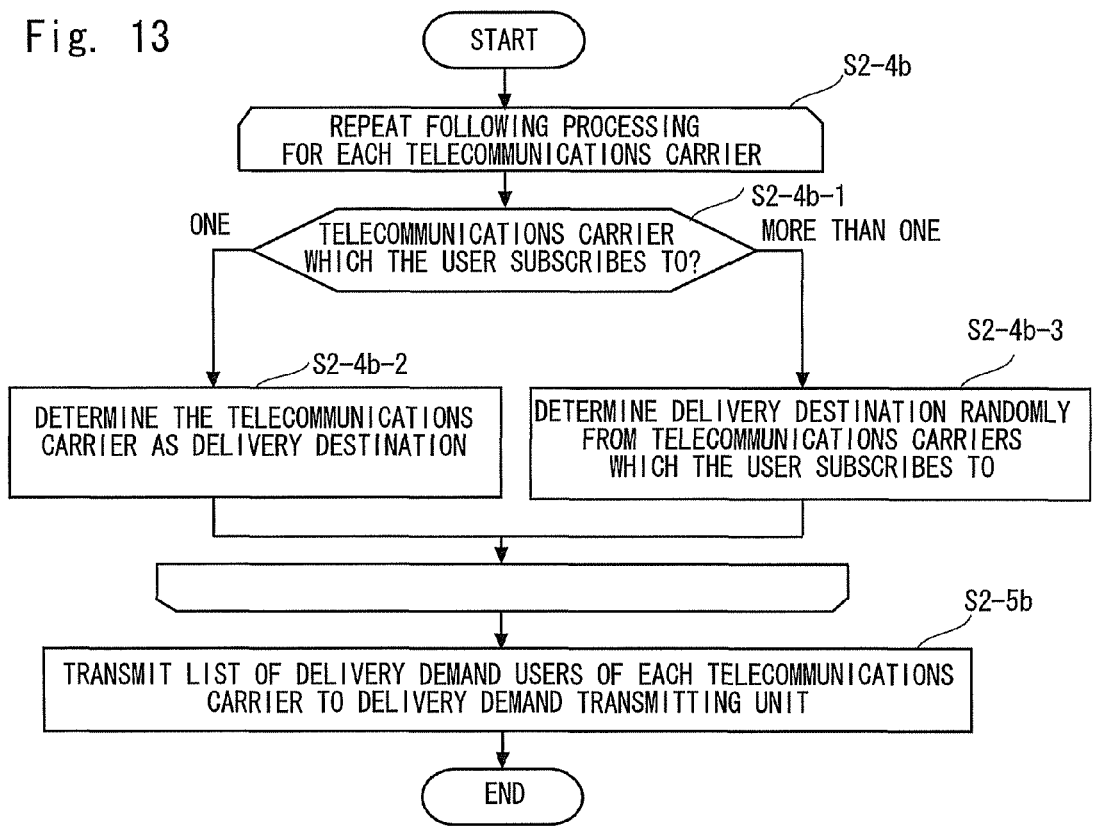
FIG. 13 is a flowchart showing an example of a delivery destination determination operation performed by the random processing delivery destination determination unit 1032.
Figure 14:
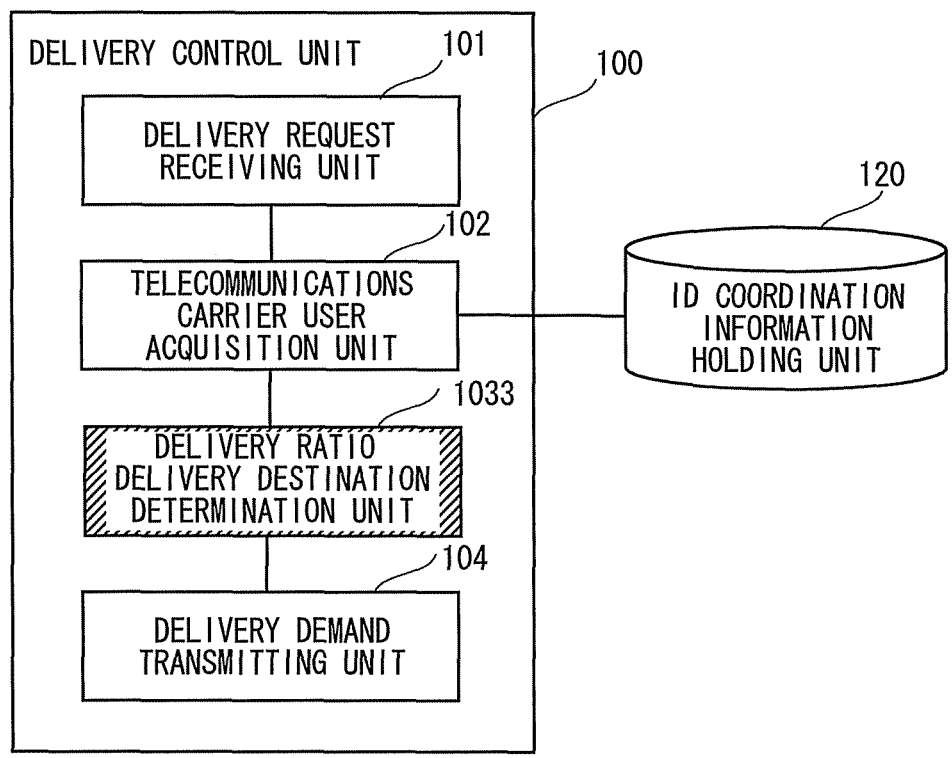
FIG. 14 is a block diagram showing a configuration example according to the fourth embodiment.
Figure 15:
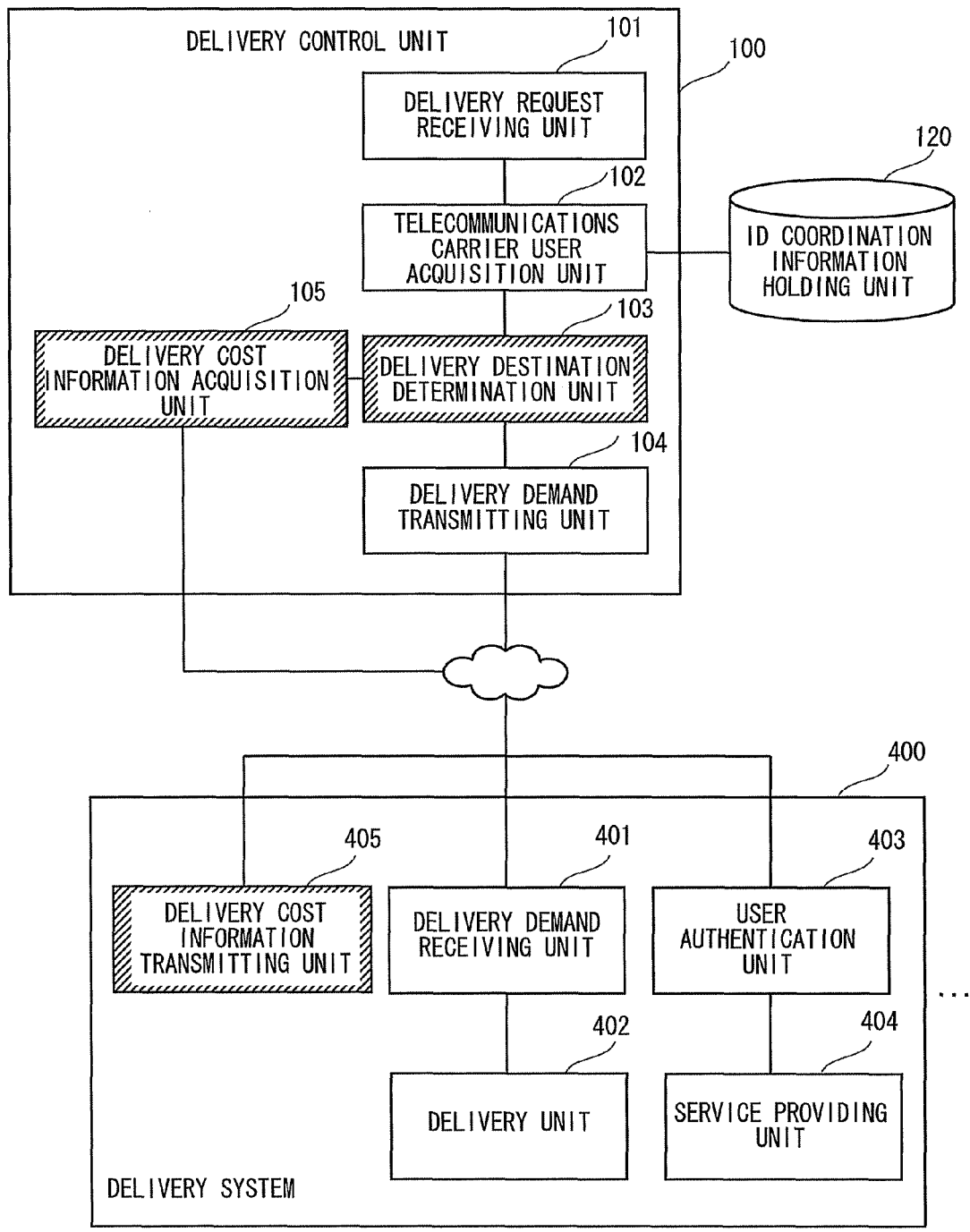
FIG. 15 is a block diagram showing a configuration example according to the fifth embodiment.
Figure 16:
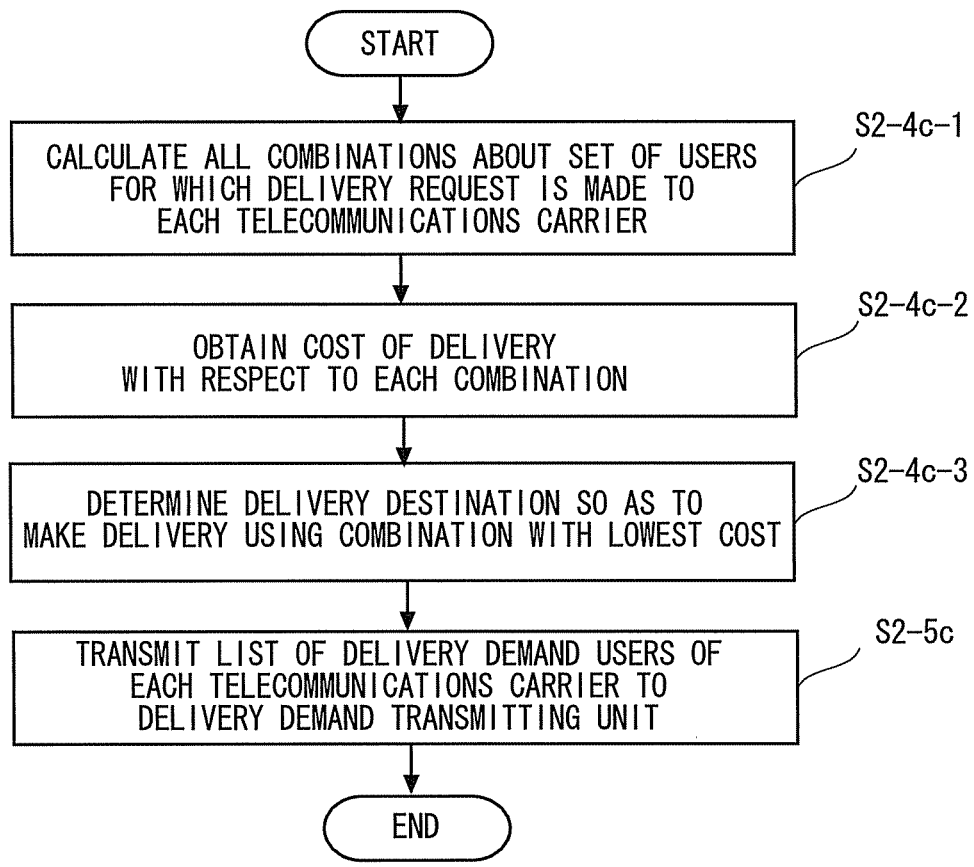
FIG. 16 is a flowchart showing an operation example of delivery destination determination processing in the fifth embodiment.
Figure 17:
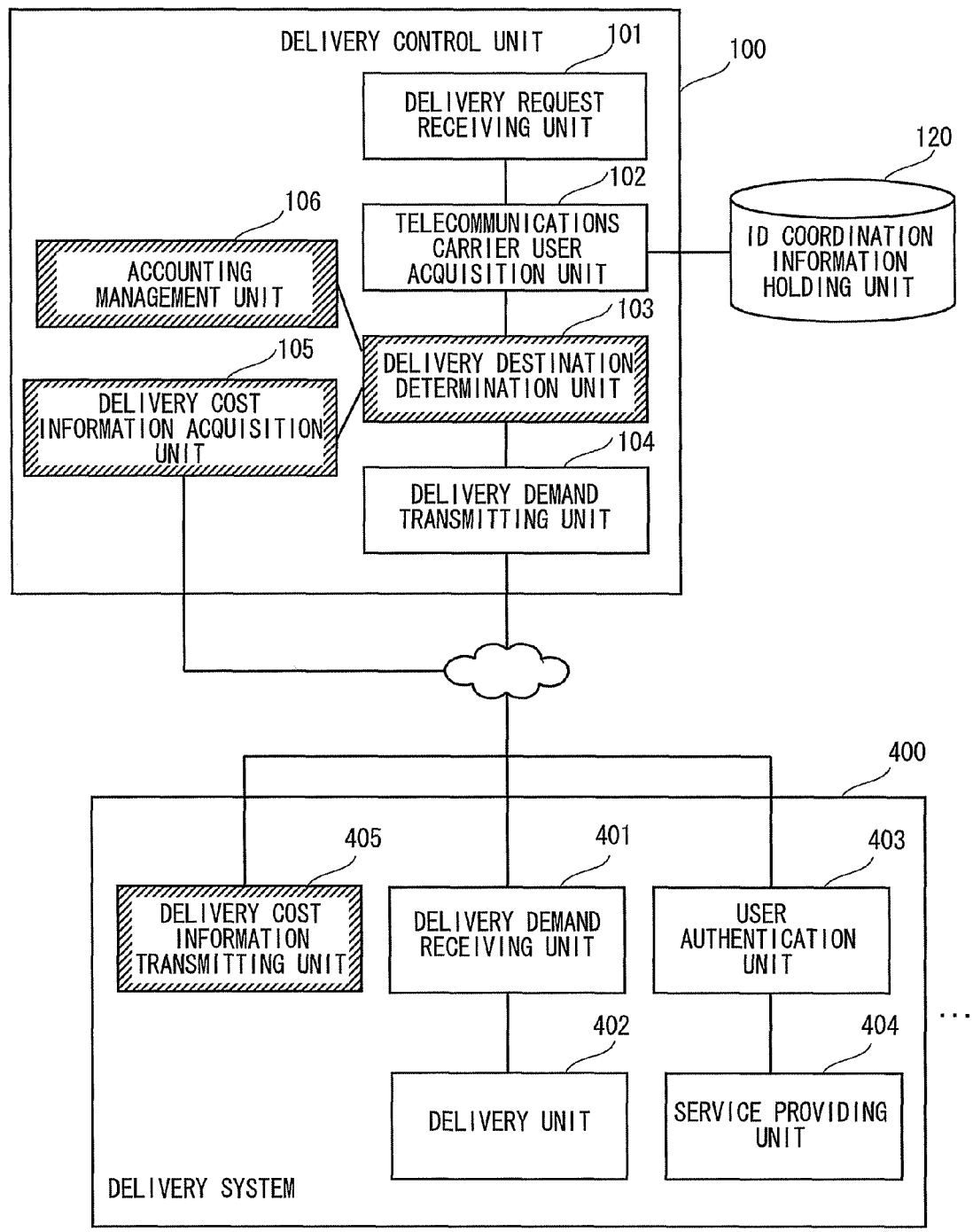
FIG. 17 is a block diagram showing another configuration example according to the fifth embodiment.
Figure 18:
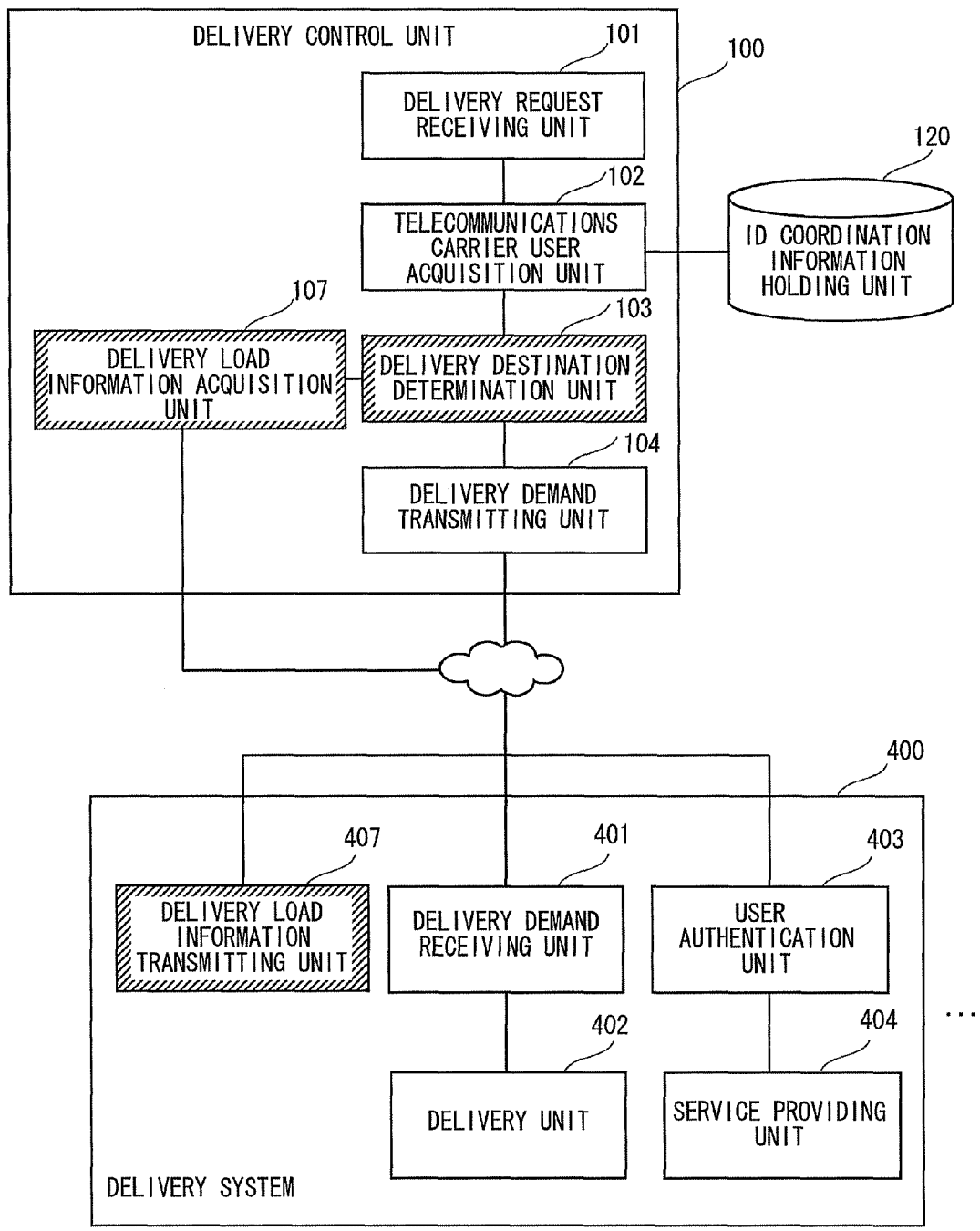
FIG. 18 is a block diagram showing a configuration example according to the sixth embodiment.
Figure 19:
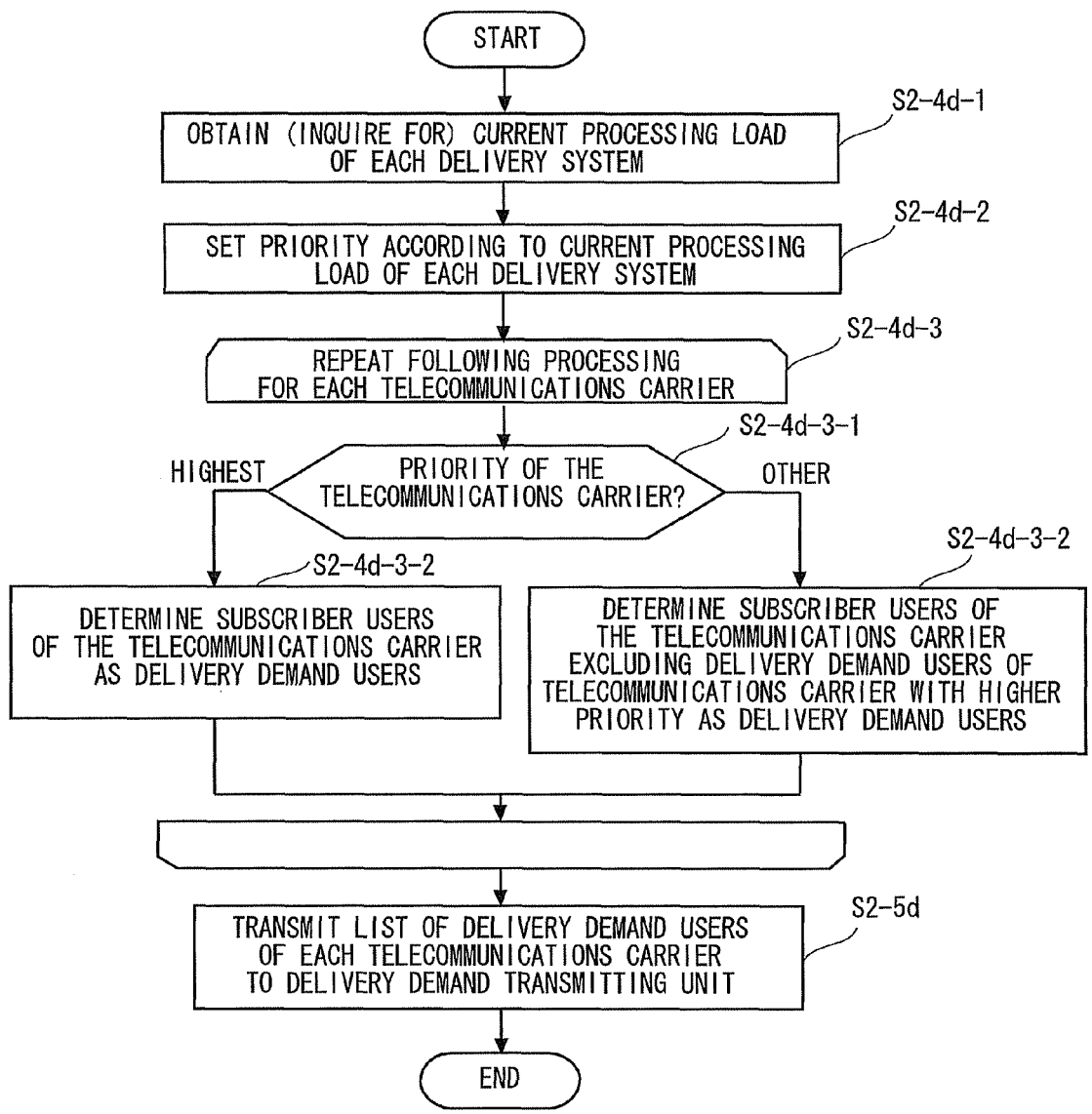
FIG. 19 is a flowchart showing an operation example of delivery destination determination processing in the sixth embodiment.
Figure 20:
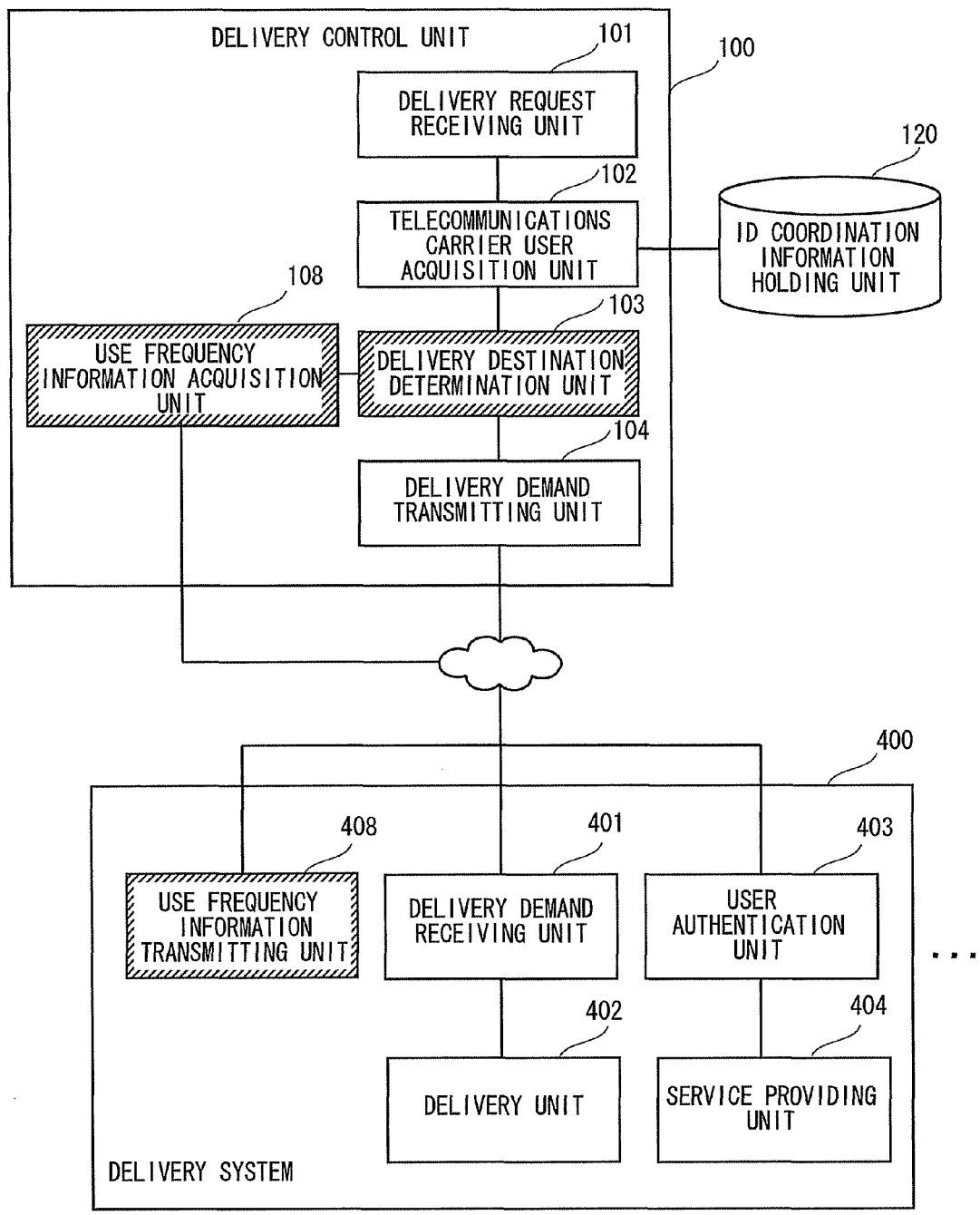
FIG. 20 is a block diagram showing a configuration example according to the seventh embodiment.
Figure 21:
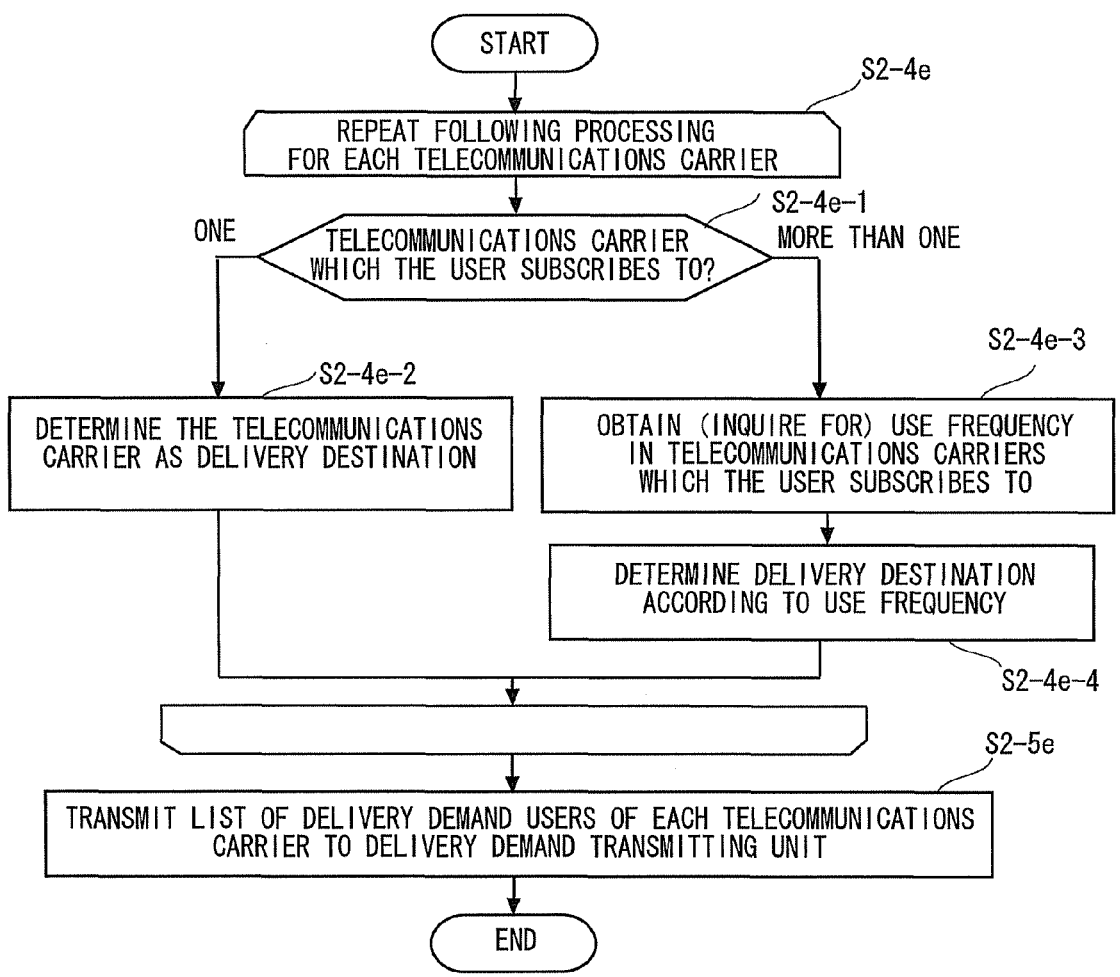
FIG. 21 is a flowchart showing an operation example of delivery destination determination processing in the seventh embodiment.
Figure 22:
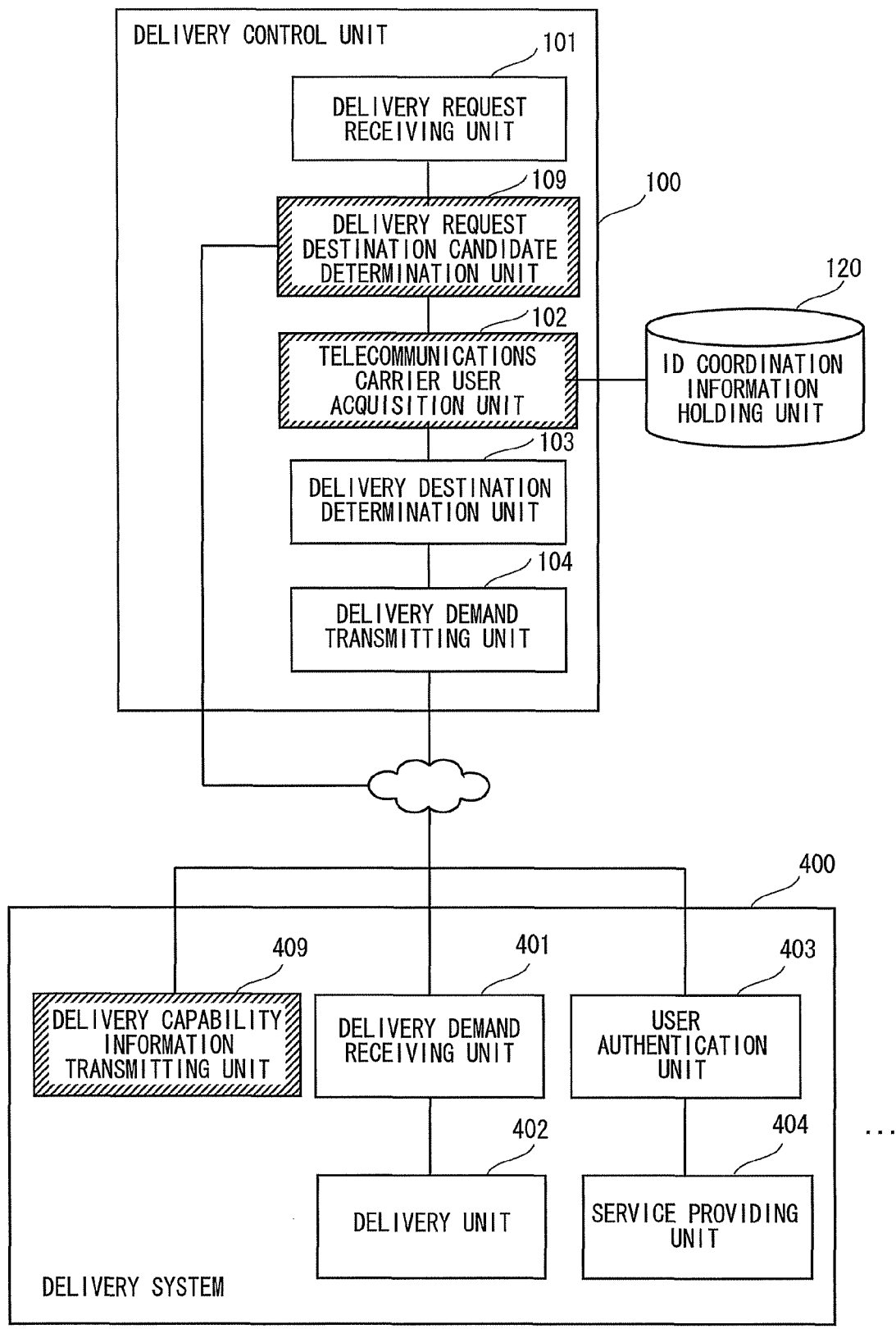
FIG. 22 is a block diagram showing a configuration example according to the eighth embodiment.
Figure 23:
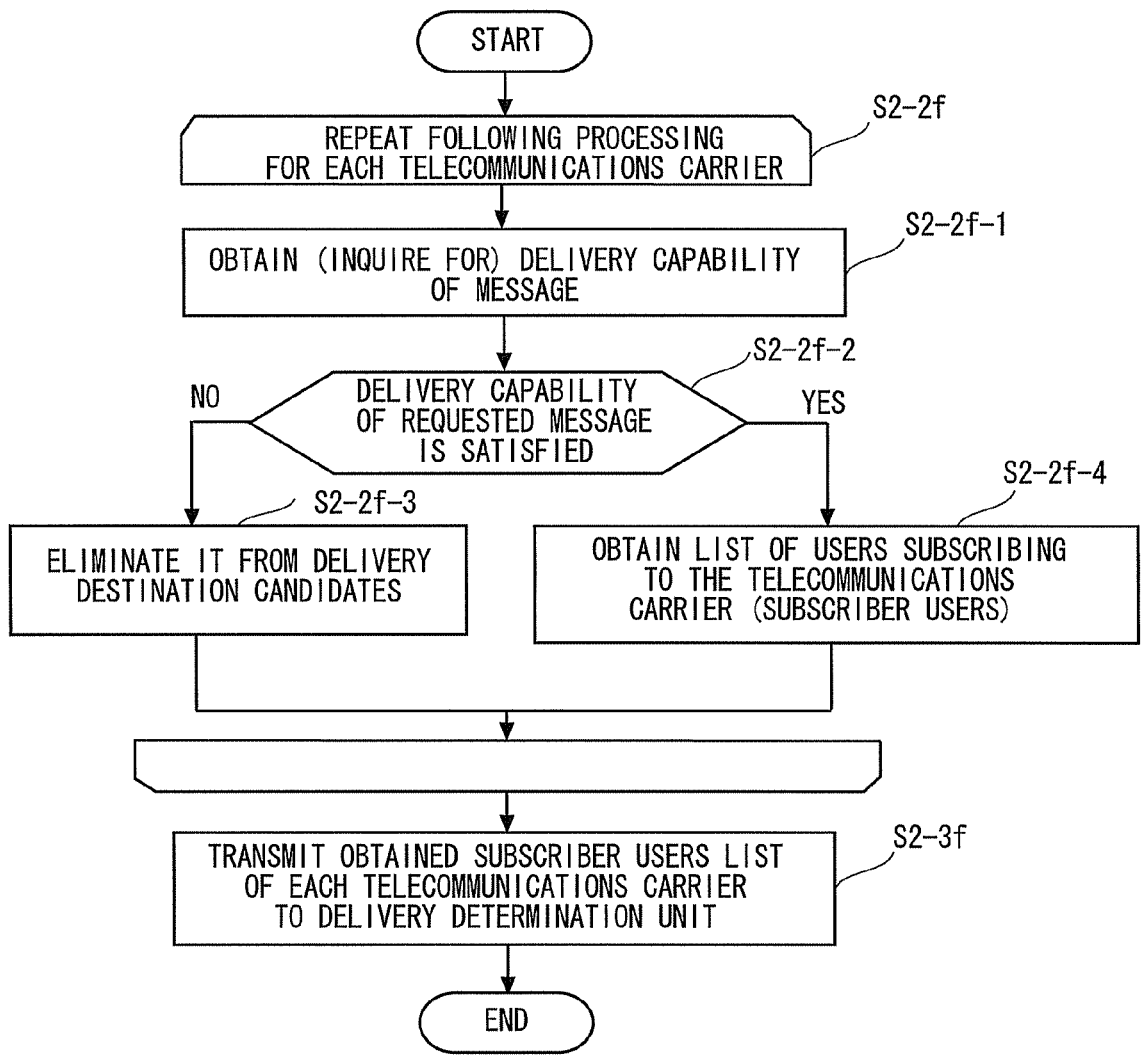
FIG. 23 is a flowchart showing an example of a delivery destination candidate determination operation and a subscriber user acquisition operation in the eighth embodiment.
Figure 24:
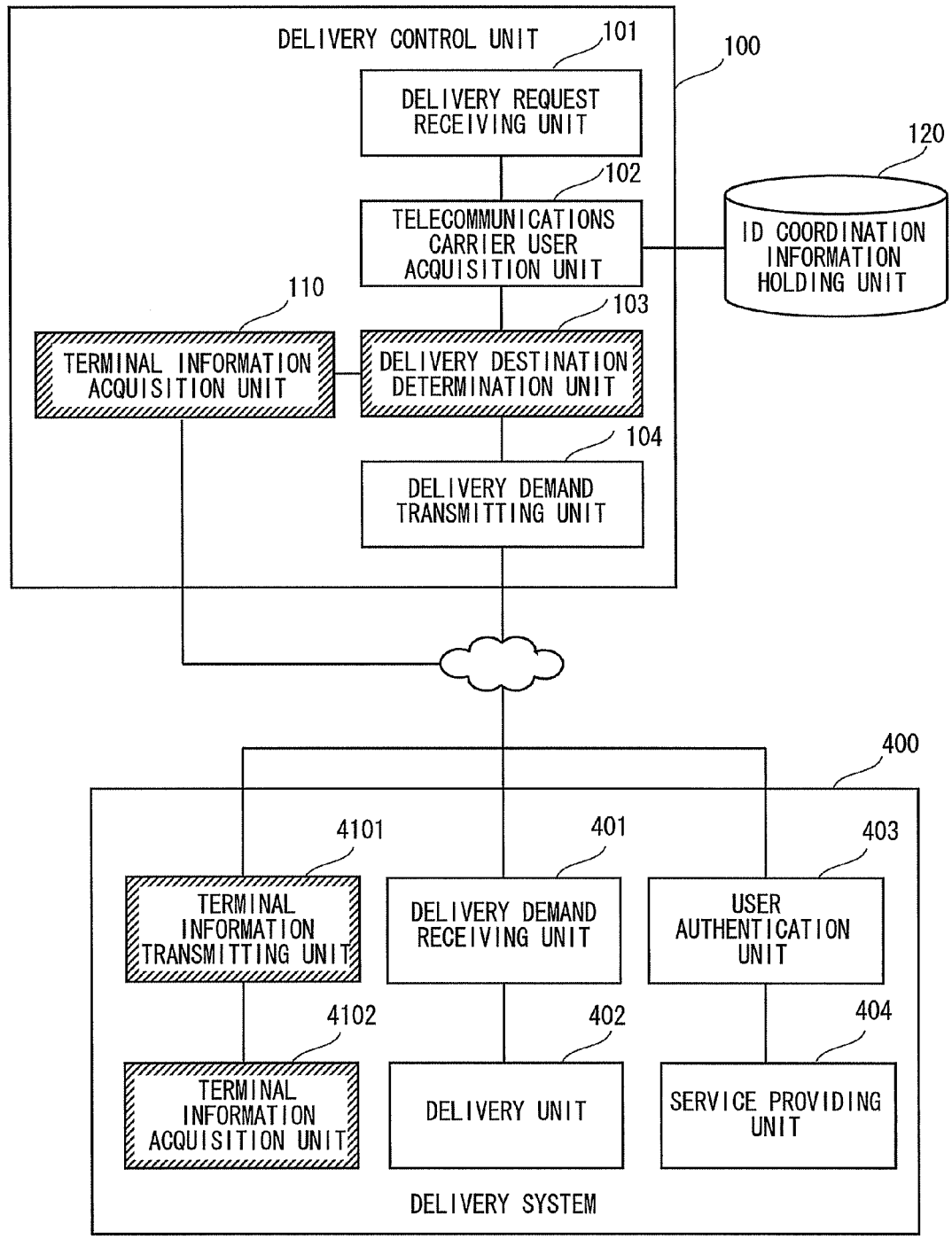
FIG. 24 is a block diagram showing a configuration example according to the ninth embodiment.
Figure 25:
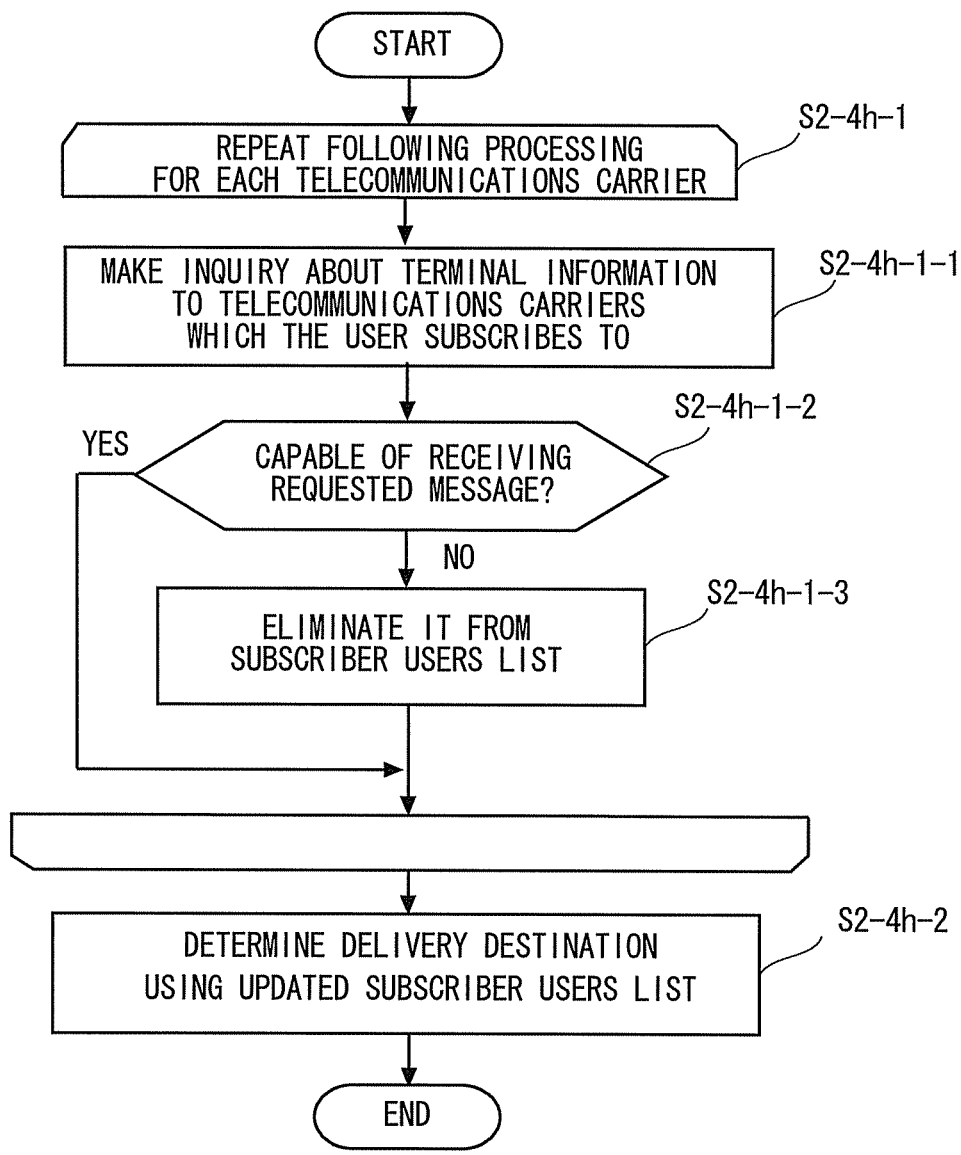
FIG. 25 is a flowchart showing an example of an operation of the ninth embodiment.
Figures 26, 27:
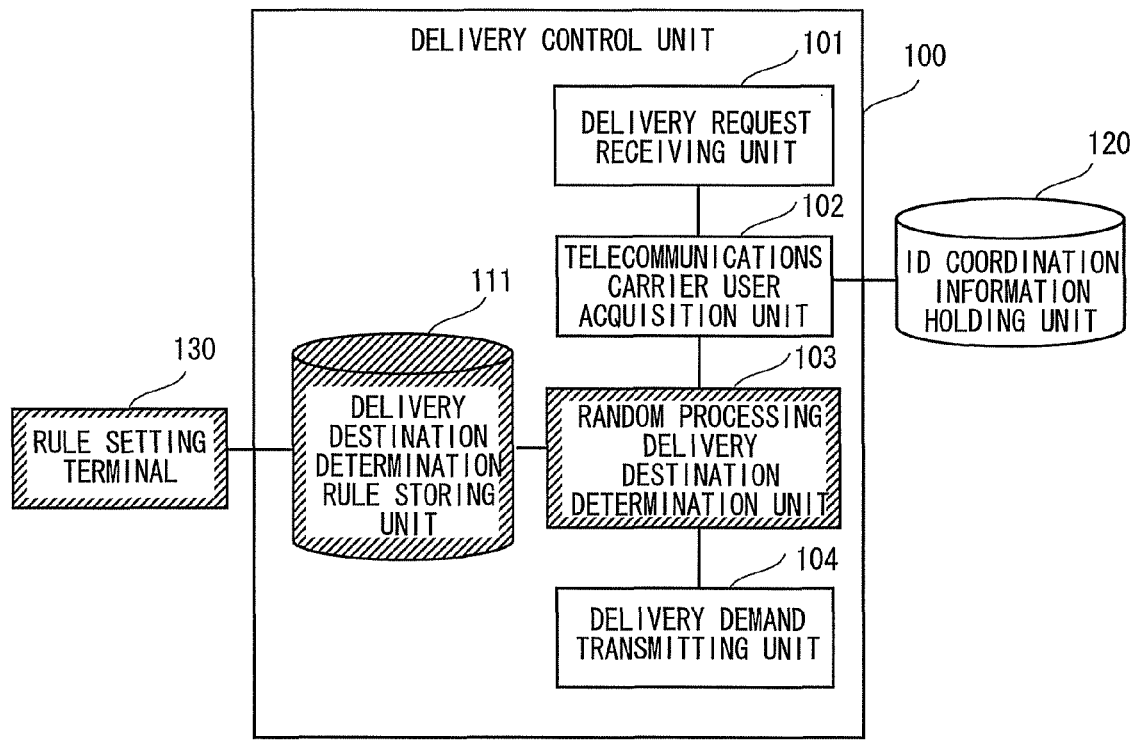
FIG. 26 is a block diagram showing a configuration example according to the tenth embodiment.
FIG. 27 is an explanatory view showing an example of a delivery destination determination rule.
Figure 28:
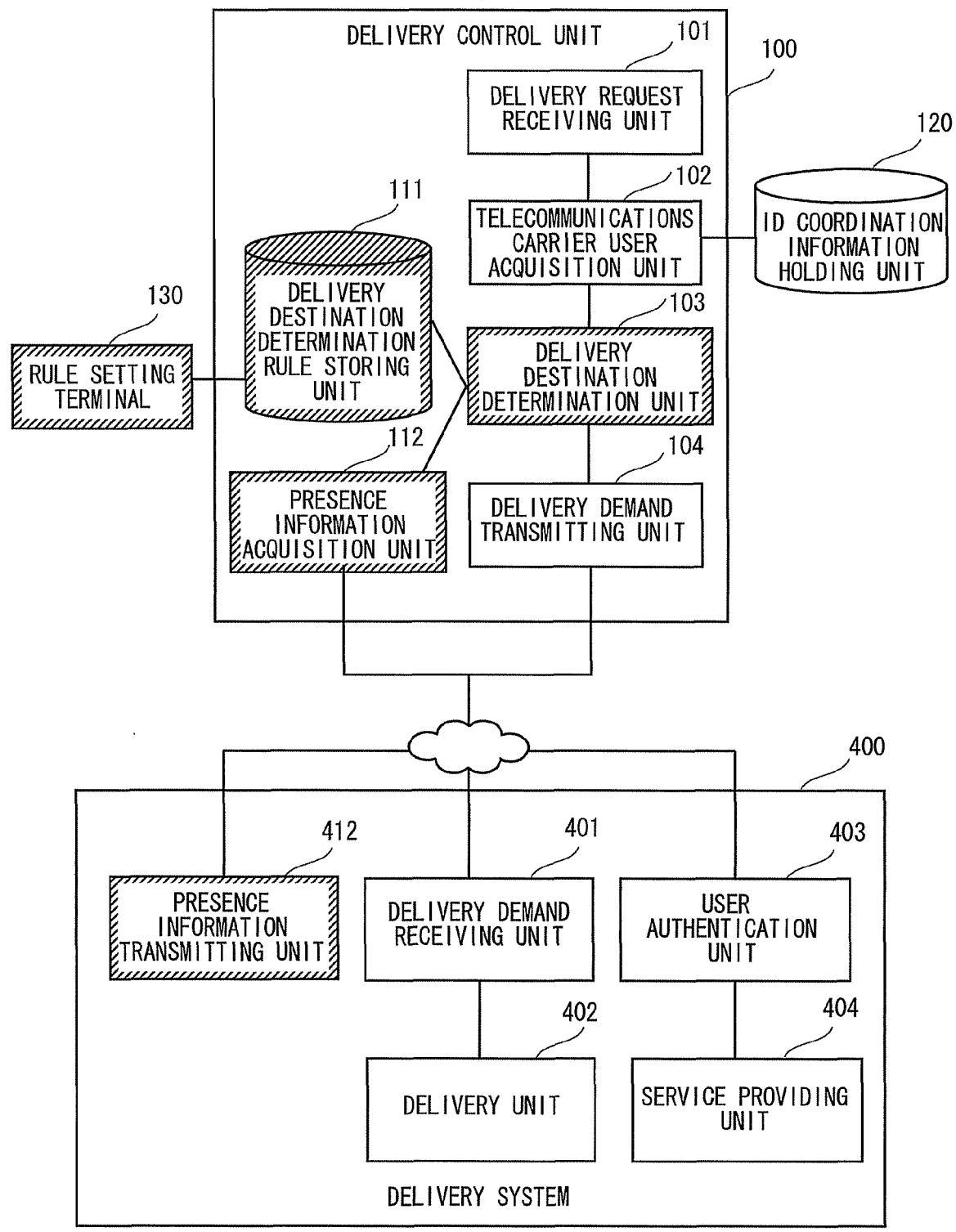
FIG. 28 is a block diagram showing a configuration example according to the eleventh embodiment.

100 DELIVERY CONTROL UNIT
120 ID FEDERATION INFORMATION HOLDING UNIT
700 ID MANAGEMENT SYSTEM
701 AUTHENTICATION EXECUTION UNIT
101 DELIVERY REQUEST RECEIVING UNIT
102 TELECOMMUNICATIONS CARRIER USER ACQUISITION UNIT
103 DELIVERY DESTINATION DETERMINATION UNIT
200 SERVICE PROVIDING SYSTEM

201 DELIVERY REQUEST TRANSMITTING UNIT
202 USER AUTHENTICATION UNIT
203 SERVICE PROVIDING UNIT
300 USER TERMINAL
400A, 400B DELIVERY SYSTEM
401 DELIVERY DEMAND RECEIVING UNIT
402 DELIVERY UNIT
403 USER AUTHENTICATION UNIT
404 SERVICE PROVIDING UNIT
800 SERVICE PROVIDING SYSTEM ADMINISTRATOR TERMINAL
1031 SEQUENCE PROCESSING DELIVERY DESTINATION DETERMINATION UNIT
1032 RANDOM PROCESSING DELIVERY DESTINATION DETERMINATION UNIT
1033 DELIVERY RATIO DELIVERY DESTINATION DETERMINATION UNIT
104 DELIVERY DEMAND TRANSMITTING UNIT
412 PRESENCE INFORMATION TRANSMITTING UNIT
105 DELIVERY COST INFORMATION ACQUISITION UNIT
405 DELIVERY COST INFORMATION TRANSMITTING UNIT
106 ACCOUNTING MANAGEMENT UNIT
107 DELIVERY LOAD INFORMATION ACQUISITION UNIT
407 DELIVERY LOAD INFORMATION TRANSMITTING UNIT
108 USE FREQUENCY INFORMATION ACQUISITION UNIT
408 USE FREQUENCY INFORMATION TRANSMITTING UNIT
109 DELIVERY REQUEST DESTINATION CANDIDATE DETERMINATION UNIT
409 DELIVERY CAPABILITY INFORMATION TRANSMITTING UNIT
110 TERMINAL INFORMATION ACQUISITION UNIT
4101 TERMINAL INFORMATION TRANSMITTING UNIT
4102 TERMINAL INFORMATION ACQUISITION UNIT
111 DELIVERY DESTINATION DETERMINATION RULE STORING UNIT
130 RULE SETTING TERMINAL
112 PRESENCE INFORMATION ACQUISITION UNIT
412 PRESENCE INFORMATION TRANSMITTING UNIT

The invention claimed is:

1. An information delivery system that delivers a message through a telecommunications carrier, the message being information delivered from a service provider to users, comprising:
an ID federation information storage that stores ID federation information being information associating a user identifier for identifying users in a service provider and a user identifier for identifying the users in a telecommunications carrier which the users subscribe to;
a delivery demand receiver that receives, from a service providing system administered by a service provider, contents of a message and a user identifier in the service provider as information indicating users to serve as a delivery target of the message;
a delivery demand processor that determines which telecommunications carriers a group of users designated as a delivery target of the message subscribed to based on ID federation information stored in the ID federation information storage, and determines a telecommunications carrier to serve as a delivery request destination of the message to the group of users from the telecommunications carriers determined that the group of users subscribe to according to a predetermined condition for the group of users; and
a delivery demand transmitter that transmits the contents of the message received by the delivery demand receiver and a user identifier in the telecommunications carrier of the group of users for which delivery request destination is the telecommunications carrier as information indicating a group of users to serve as a delivery target of the message to a delivery system of the telecommunications carrier determined as a delivery request destination by the delivery demand processor,
wherein, as for a group of users who subscribe to a plurality of telecommunications carriers, the delivery demand processor determines any one telecommunications carrier among the telecommunications carriers which the group of users subscribe to as a delivery request destination of a message,
wherein, as for a group of users who subscribe to a plurality of telecommunications carriers, the delivery demand processing unit determines a telecommunications carrier to serve as a delivery request destination according to priorities at a given point of time while changing priorities at predetermined timing along a preset sequence of the telecommunications carriers, and
wherein, as for users who subscribe to a plurality of telecommunications carriers, the delivery demand processing unit randomly determines a telecommunications carrier to serve as a delivery request destination, so that "maximum number of message transmission" is not exceeded, the maximum number of message transmission being a maximum value for the number of messages a telecommunications carrier can transmits for a given group of users.

2. The information delivery system according to claim 1, wherein, as for a group of users who subscribe to a plurality of telecommunications carriers, the delivery demand processing unit determines a designated number or less of telecommunications carriers among the telecommunications carriers which the group of users subscribe to as a delivery request destination of a message.

3. The information delivery system according to claim 1, wherein, as for a group of users who subscribe to a plurality of telecommunications carriers, the delivery demand processing unit determines a telecommunications carrier to serve as a delivery request destination according to a predetermined method.

4. The information delivery system according to claim 1, wherein, as for a group of users who subscribe to a plurality of telecommunications carriers, the delivery demand processing unit determines a telecommunications carrier to serve as a delivery request destination according to preset priorities of the telecommunications carriers.

5. The information delivery system according to claim 1, wherein, as for the group of users who subscribe to a plurality of telecommunications carriers, the delivery demand processing unit determines a telecommunications carrier to serve as a delivery request destination according to a preset delivery ratio for the telecommunications carriers.

6. The information delivery system according to claim 1, wherein the delivery demand processing unit determines a telecommunications carrier to serve as a delivery request destination based on information obtained by making an inquiry to a delivery system of a telecommunications carrier.

7. The information delivery system according to claim 6, wherein the delivery demand processing unit makes an inquiry about a cost for message delivery to a delivery system of a telecommunications carrier and determines a telecommunications carrier to serve as a delivery request destination according to the cost for message delivery to the group of users in each telecommunications carrier obtained as a result.

8. The information delivery system according to claim 6, wherein the delivery demand processing unit makes an inquiry about a load state of message delivery processing to a delivery system of a telecommunications carrier and determines a telecommunications carrier to serve as a delivery request destination according to a load state of message delivery processing to the group of users in each telecommunications carrier obtained as a result.

9. The information delivery system according to claim 6, wherein the delivery demand processing unit makes an inquiry about a use frequency of a user to a delivery system of a telecommunications carrier and determines a telecommunications carrier to serve as a delivery request destination according to a use frequency of a user in each telecommunications carrier obtained as a result.

10. The information delivery system according to claim 6, wherein the delivery demand processing unit makes an inquiry about a message delivery capability to a delivery system of a telecommunications carrier, determines whether the telecommunications carrier is capable of delivering a message intended to be delivered based on a message delivery capability obtained as a result, and determines a telecommunications carrier to serve as a delivery request destination from telecommunications carriers capable of delivering a message intended to be delivered.

11. The information delivery system according to claim 1, wherein, as for a user designated as a delivery target of a message, the delivery demand processing unit makes an inquiry to a delivery system of a telecommunications carrier which the user subscribes to about a message receiving capability of the user in the delivery system, determines whether the user is capable of receiving a message intended to be delivered through the telecommunications carrier based on a message receiving capability of the user in the telecommunications carrier obtained as a result, and determines a telecommunications carrier to serve as a delivery request destination from telecommunications carriers with which the user is capable of receiving a message intended to be delivered.

12. The information delivery system according to claim 1, wherein the delivery demand processing unit determines a telecommunications carrier to serve as a delivery request destination according to a delivery destination determination rule that defines a method of determining a delivery request destination and a condition for performing the method, and determines a telecommunications carrier according to the rule as for a group of users who subscribe to a plurality of telecommunications carriers.

13. The information delivery system according to claim 12, wherein
a condition related to presence information of a user is set to the delivery destination determination rule, and
the delivery demand processing unit determines a telecommunications carrier to serve as a delivery request destination for each user by determining whether each user matches the condition of the delivery destination determination rule based on presence information of a user obtained from a delivery system of a telecommunications carrier.

14. A delivery destination control method for delivering a message through a telecommunications carrier, which is information delivered from a service provider to users, comprising:

storing ID federation information being information associating a user identifier for identifying users in a service provider and a user identifier for identifying the users in a telecommunications carrier which the users subscribe to;
receiving, from a service providing system administered by a service provider, contents of a message and a user identifier in the service provider as information indicating users to serve as a delivery target of the message;
determining which telecommunications carriers the group of users designated as a delivery target of the message subscribed to based on ID federation information stored in the ID federation information storage unit, and determining a telecommunications carrier to serve as a delivery request destination of the message to the group of users from the telecommunications carriers determined that the group of users subscribe to according to a predetermined condition for the group of users; and
transmitting the contents of the received message and a user identifier in the telecommunications carrier of the group of users for which delivery request destination is the telecommunications carrier as information indicating the group of users to serve as a delivery target of the message to a delivery system of the telecommunications carrier determined as a delivery request destination,
wherein, as for a group of users who subscribe to a plurality of telecommunications carriers, any one telecommunications carrier among the telecommunications carriers which the group of users subscribe to is determined as a delivery request destination of a message,
wherein, as for a group of users who subscribe to a plurality of telecommunications carriers, a telecommunications carrier to serve as a delivery request destination is determined according to priorities at a given point of time while changing priorities at predetermined timing along a preset sequence of the telecommunications carriers, and
wherein, as for users who subscribe to a plurality of telecommunications carriers, a telecommunications carrier to serve as a delivery request destination is randomly determined so that "maximum number of message transmission" is not exceeded, the maximum number of message transmission being a maximum value for the number of messages a telecommunications carrier can transmits for a given group of users.

15. The delivery destination control method according to claim 14, wherein, as for a user who subscribes to a plurality of telecommunications carriers, a designated number or less of telecommunications carriers among the telecommunications carriers which the user subscribes to is determined as a delivery request destination of a message.

16. A non-transitory computer-readable medium storing a delivery destination control program for delivering a message through a telecommunications carrier which is information delivered from a service provider to users, the program running a computer to execute:
processing of receiving, from a service providing system administered by a service provider, contents of a message and a user identifier in the service provider as information indicating users to serve as a delivery target of the message;
processing of determining which telecommunications carriers the group of users designated as a delivery target of the message subscribed to based on ID federation information being information associating a user identifier for identifying a group of users in a service provider and a user identifier for identifying the users in a telecommunications carrier which the group of users subscribe to, and determining a telecommunications carrier to serve as a delivery request destination of the message to the group of users from the telecommunications carriers determined that the group of users subscribe to according to a predetermined condition for the group of users; and processing of transmitting the contents of the received message and a user identifier in the telecommunications carrier of the group of users for which delivery request destination is the telecommunications carrier as information indicating a group of users to serve as a delivery target of the message to a delivery system of the telecommunications carrier determined as a delivery request destination, wherein processing of determining determines any one telecommunications carrier among the telecommunications carriers which the group of users subscribe to as delivery request destination of a message, as for the group of users who subscribe to a plurality of telecommunications carriers, wherein the processing of determining determines a telecommunications carrier to serve as a delivery request destination according to priorities at a given point of time while changing priorities at predetermined timing along a preset sequence of the telecommunications carriers, and wherein the processing of determining randomly determines a telecommunications carrier to serve as a delivery request destination so that "maximum number of message transmission" is not exceeded, the maximum number of message transmission being a maximum value for the number of messages a telecommunications carrier can transmits for a given group of users.

17. The non-transitory computer-readable medium storing the delivery destination control program according to claim 16, wherein the processing of determining determines a designated number or less of telecommunications carriers among the telecommunications carriers which the group of users subscribe to as a delivery request destination of a message, as for a group of users who subscribe to a plurality of telecommunications carriers.

* * * * *